(12) United States Patent
Moshier

(10) Patent No.: US 6,488,232 B2
(45) Date of Patent: *Dec. 3, 2002

(54) SINGLE PASSENGER AIRCRAFT

(75) Inventor: Michael Moshier, Los Altos Hills, CA (US)

(73) Assignee: Trek Aerospace, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,706

(22) Filed: Dec. 16, 1998

(65) Prior Publication Data
US 2002/0003188 A1 Jan. 10, 2002

(51) Int. Cl.⁷ ............................................ B64C 29/00
(52) U.S. Cl. ...................................... 244/4 A; 244/4 R
(58) Field of Search .............................. 244/4 R, 17.14, 244/7 R, 7 A, 17.11, 73 A, 4 A; 74/502, 503

(56) References Cited

U.S. PATENT DOCUMENTS

| 1,838,327 | A | * | 12/1931 | Salisbury et al. |
| 2,417,896 | A | | 3/1947 | Zimmerman |
| 2,571,566 | A | * | 10/1951 | Green ..................... 244/17.23 |
| 3,021,095 | A | * | 2/1962 | Moore |
| 3,029,047 | A | * | 4/1962 | Jacobsen et al. |
| 3,149,798 | A | | 9/1964 | Moore |
| 3,149,799 | A | | 9/1964 | Hulbert |
| 3,173,629 | A | | 3/1965 | Uhor |
| 3,211,399 | A | * | 10/1965 | Eickmann ................. 244/17.23 |
| 3,243,144 | A | * | 3/1966 | Hulbert et al. |
| 3,474,987 | A | | 10/1969 | Meditz |
| RE26,756 | E | * | 1/1970 | Moore et al. |
| 3,556,438 | A | | 1/1971 | Meditz |
| 3,586,263 | A | | 6/1971 | Payne |
| 3,666,209 | A | * | 5/1972 | Taylor |
| 3,987,294 | A | * | 10/1976 | Carlson |
| D243,594 | S | | 3/1977 | Koch |
| 4,163,535 | A | * | 8/1979 | Austin |
| 4,832,211 | A | * | 5/1989 | Matthews et al. |
| 5,779,188 | A | * | 7/1998 | Frick |
| 5,873,500 | A | * | 2/1999 | Homburg et al. |

FOREIGN PATENT DOCUMENTS

| DE | 673964 | * | 3/1939 | ................. 244/4 A |
| DE | 2 021 043 | | 11/1971 | |
| DE | 2628274 A1 | | 1/1978 | |
| DE | 43 02 791 | | 8/1994 | |
| FR | 1331306 | * | 3/1939 | ................. 244/4 A |
| FR | 2 667 568 | | 4/1992 | |

OTHER PUBLICATIONS

Translation from German to English of German Reference 2 021 D43, pp. 2 to 10.

* cited by examiner

Primary Examiner—Charles T. Jordan
Assistant Examiner—T. Dinh
(74) Attorney, Agent, or Firm—Squire, Sanders & Dempsey, L.L.P.

(57) ABSTRACT

Disclosed is a single passenger aircraft configured to vertically take-off and land. An airframe is configured to support the passenger in an upright position during take-off and landing and during flight. The aircraft includes a pair of propulsion devices that are mounted on an airframe above the level of the pilot. A set of hand operated control devices are mechanically linked to the propulsion devices for varying the orientation of the propulsion devices during flight.

19 Claims, 21 Drawing Sheets

SINGLE PASSENGER AIRCRAFT

BACKGROUND OF THE INVENTION

1. Field of the Invention

The present invention relates to the field of aircraft. More particularly, the present invention relates to a vertical take-off and landing aircraft that transports a passenger in an upright position during flight.

2. Description of the Related Art

There have been numerous efforts to design a reliable personal or single passenger aircraft that transports a passenger easily and safely from one location to another. Unfortunately, past single-passenger aircraft designs are impractical for everyday type use by the average person. Past designs also suffer from other drawbacks, such as the use of hazardous fuel, the consumption of a great amount of storage space, or they suffer from unstable and unsafe flight characteristics.

For example, one type of design comprises a conventional type of aircraft having a propulsion device, such as a fan unit, and a plurality of flight surfaces, such as wings, extending outwardly therefrom. Such aircraft are large and bulky and are generally not suitable for quick transportation from one location to another. These types of aircraft generally require long landing and take off strips that consume large amounts of land space. Additionally, such aircraft are generally difficult to control during flight, requiring the pilot to become well-versed in the flight mechanics of the aircraft. This makes these aircraft unsuitable for the quick traversing of great distances and, therefore, impractical for day-to-day travel.

Another type of design consists of a "flightpack" comprised of a small structure that fits on or around the torso of the pilot. The flight pack designs typically include propulsion devices, such as propellers, jets, or rockets, that are supported by the pilot's torso. While these flightpacks are small and require little take-off and landing space, they are unfortunately generally unstable and dangerous during flight and therefore unsafe for the general population. The high likelihood of the passenger losing control of such aircraft is a strong drawback. One additional drawback of current flightpacks is that the passenger is typically required to support the heavy airframe on his or her back, which is highly uncomfortable. Alternatively, the passenger may be required to orient himself in awkward positions during flight which makes the use of such aircraft uncomfortable and impractical.

Another drawback of current personal aircraft designs is that they are generally powered using complex, aircraft-type engine structures which require expensive and highly volatile aircraft fuel for operation. These engines are also loud which makes use of these aircraft in populated areas very inefficient.

There is therefore a need for a single passenger aircraft that is more practical in use than past designs.

SUMMARY OF THE INVENTION

The aforementioned needs are satisfied by the present invention which relates to an aircraft which is configured to accommodate a single passenger. The aircraft is comprised of an airframe that supports the passenger in an upright position. The airframe advantageously maintains the pilot in the same upright orientation during both take-off and landing and during flight. This increases the comfort level of the pilot during operation of the aircraft and provides an advantageously unobstructed field of vision. The single passenger aircraft is stable during flight and relatively compact in size to reduce the amount of required storage space when the aircraft is not in use. Additionally, because the aircraft is a vertical take-off and landing craft, it does not require large amounts of take-off and landing space.

In a preferred embodiment, a pair of propulsion devices, such as high-powered fan units, are attached to the airframe above the level of the pilot for providing lift and propulsion to the aircraft. The propulsion devices are desirably configured to be tilted to vary the direction of thrust to thereby control the aircraft during flight. Preferably, a single engine is mounted on the airframe for driving the propulsion devices via a powertrain system comprised of a drive shaft that extends along the body line of the pilot. The engine is desirably disposed on the airframe behind and slightly below the level of the pilot for facilitating a centered and relatively low center of gravity position.

The aircraft also includes a control and stability system preferably comprised of a set of hand-operated control devices that allow the pilot to vary the orientation and power of the propulsion devices. In one embodiment, the control device comprises a main control bar that may raised or lowered to collectively tilt the propulsion devices. A pair of small hand controls are mounted on the main control bar for providing additional control over the propulsion devices. One of the hand controls is preferably used for both collectively and differentially tilting the fan units to thereby vary the direction of thrust and control the direction of flight. The other hand grip desirably controls the engine throttle. Desirably, the pilot may shift his or her weight port or starboard to induce moments on the aircraft and thereby provide additional control over the aircraft.

The aircraft takes-off and lands vertically to eliminate the need for landing strips. Additionally, the airframe has a relatively small footprint so that ground storage space is minimized. The aforementioned features combine to make the aircraft practical for everyday use.

In one aspect of the invention, there is disclosed a single passenger, vertical take-off and landing aircraft, comprising an airframe configured to support a pilot in an upright position, the airframe being symmetric about a medial plane; a pair of propulsion devices mounted on an upper end of the airframe above the pilot, the propulsion devices each being rotatable about a common axis of rotation; an engine mounted on the airframe adjacent the pilot, the engine being drivingly coupled to each of the propulsion devices; and a movable control arm on the airframe, the control arm being mechanically coupled to the propulsion devices so that the propulsion devices rotate about the common axis in response to movement of the control arm.

The aircraft is a convenient and safe means of transporting a single passenger between locations. The single passenger aircraft is stable during flight and extremely compact in size so that the aircraft footprint and the necessary amount of ground storage space is minimal. The natural, upright position of the pilot during flight and small level of take-off and landing space make the aircraft ideal for day-to-day use.

BRIEF DESCRIPTION OF THE DRAWINGS

These and other features of the invention will now be described with reference to the drawings of a preferred embodiment, which are intended to illustrate and not to limit the invention, and in which.

DETAILED DESCRIPTION OF THE PREFERRED EMBODIMENT

Figure 1:
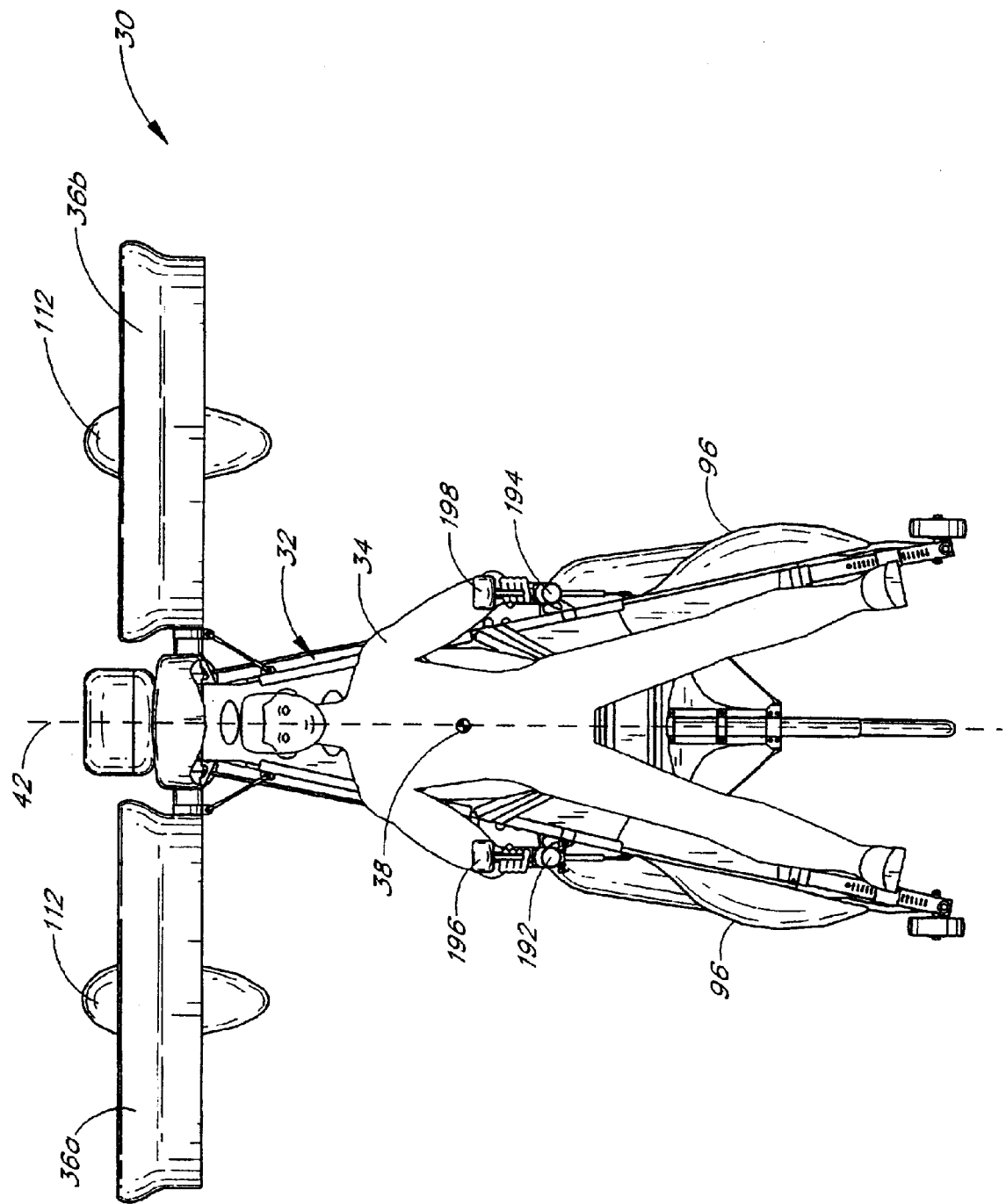
FIG. 1 is a front elevational view of the aircraft of the present invention.
Figure 2:
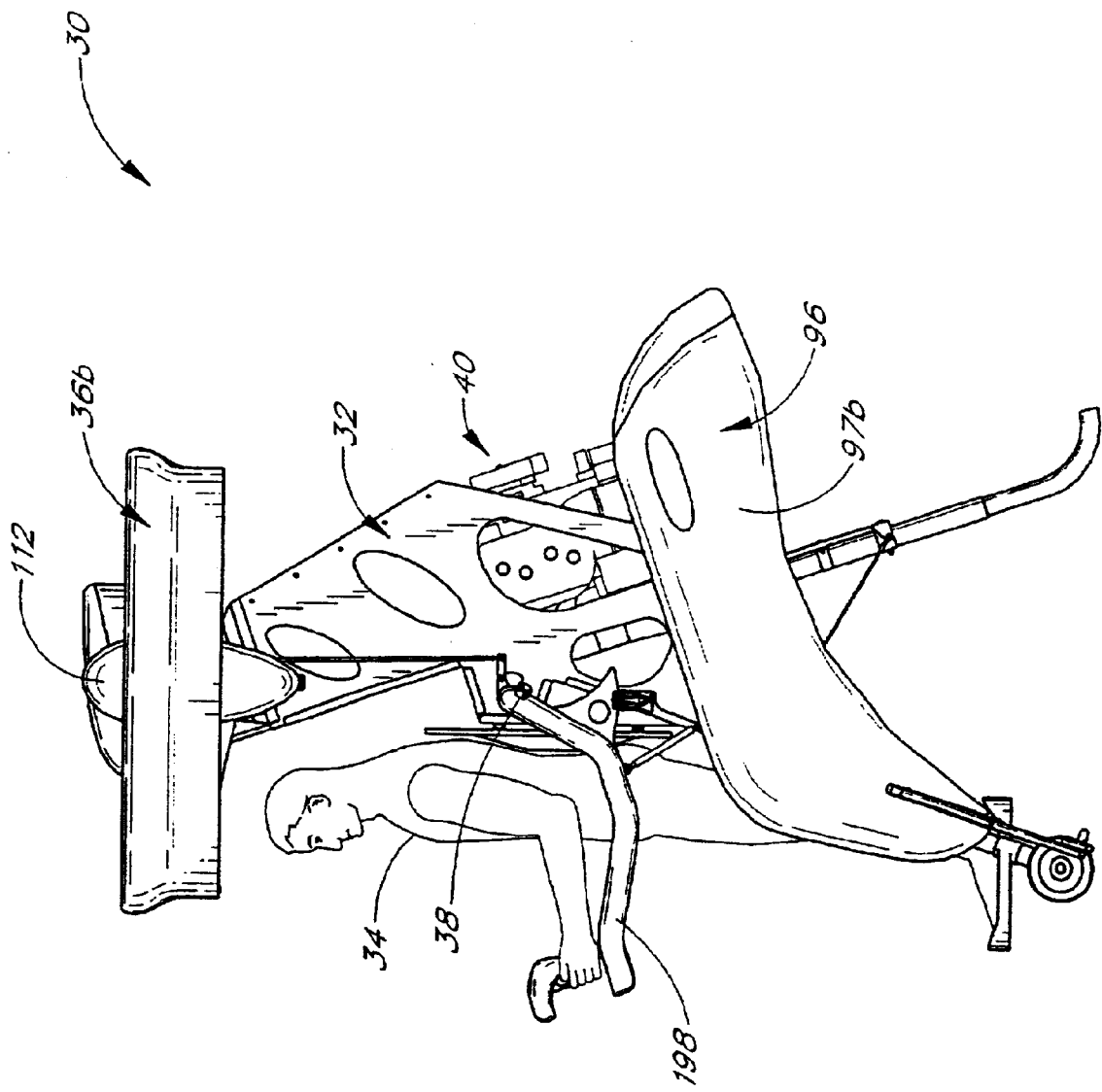
FIG. 2 is a port side elevational view of the aircraft of the present invention.

FIGS. 1 and 2 are front and side elevational views, respectively, of an aircraft 30 that is configured to accommodate a single pilot 34. The aircraft 30 takes-off and lands vertically and transitions to forward flight with the pilot 34 supported in a standing, or upright, orientation. Advantageously, the pilot 34 remains in a natural upright position continuously during flight. The weight of the pilot 34 is supported by a compact airframe 32 that stands in an upright position when the aircraft is not in use. Desirably, the pilot 34 controls the aircraft 30 using a combination of ergonomic control mechanisms and weight-shifting of the pilot's torso on the airframe. As described more fully below, the aircraft 30 is powered by an internal combustion engine that is fueled by standard gasoline for ease of use and high reliability.

The aircraft 30 generally comprises a plurality of interlinked systems that are each described in detail below. The aircraft systems include an airframe 32 comprised of a plurality of panels and interconnecting bracketry. A propulsion system is supported by the airframe for providing lift and propulsion. The propulsion system is preferably comprised of a pair of propulsion devices, such as fan assemblies 36a, 36b (referred to collectively as "fan assemblies 36") that are symmetrically disposed on an upper portion of the frame 32 above the pilot 34. A control and stability system comprised of a plurality of hand-operated control mechanisms and linkages is mechanically coupled to the fans 36 for varying the orientation thereof during flight. As best shown in FIG. 2, a powerplant system comprised of an engine 40 is disposed on the frame 32 rearward of the pilot 34 and generally below the torso level of the pilot 34. The aircraft 30 further comprises a powertrain system including a set of drive axles for drivingly coupling the engine 40 to the fan assemblies 36.

The various systems of the aircraft 30 combine to provide the aircraft with a reliable and safe flight profile. The upwardly-extending airframe consumes a relatively small amount of ground area so that the aircraft 30 may be easily stored when not in use. The small size of the aircraft combined with the vertical take-off and landing characteristics make the aircraft ideal for practical or everyday use. Each of the aircraft systems is described in detail in the following sections.

Airframe

Figure 3:
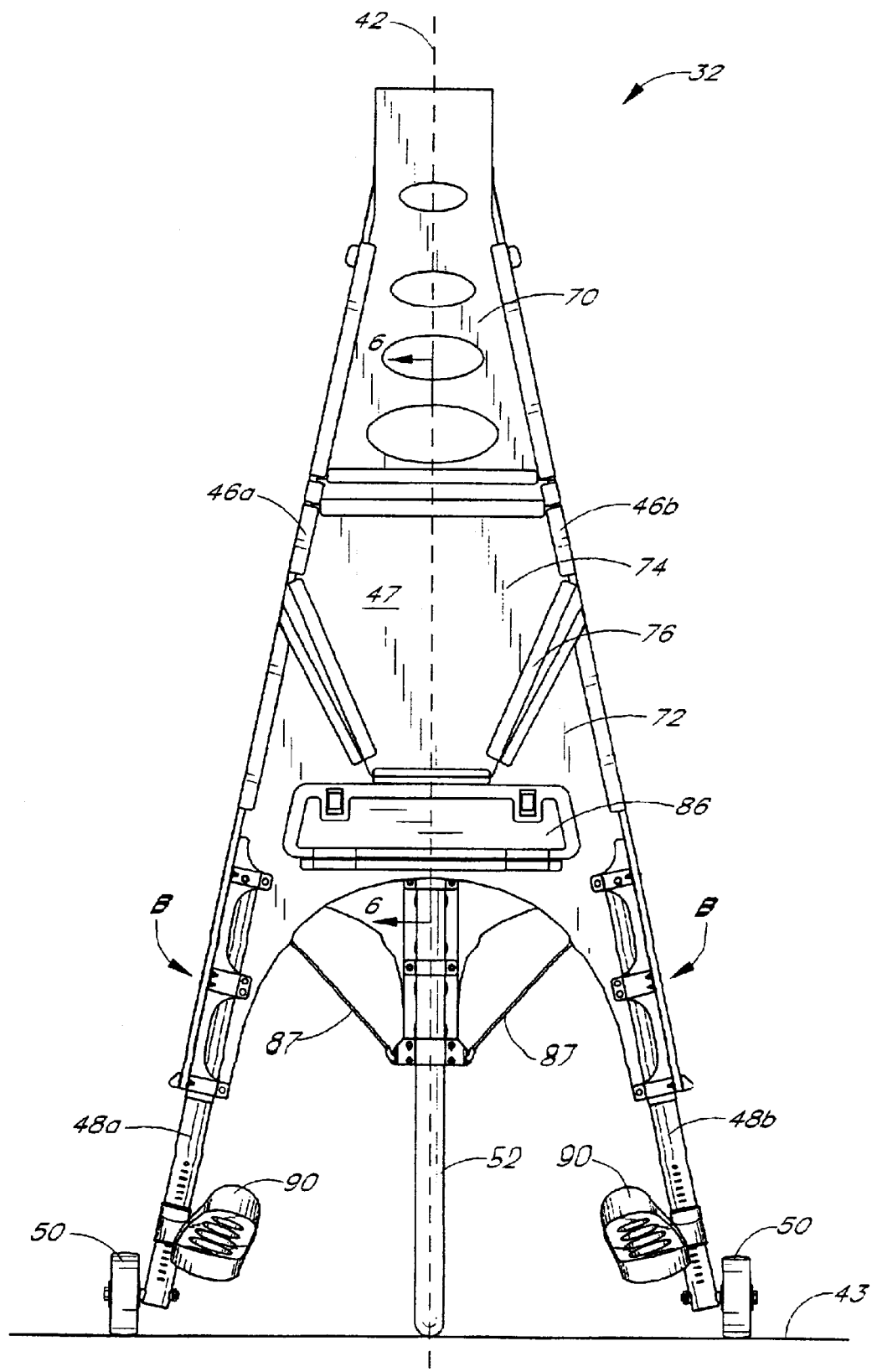
FIG. 3 is a front elevational view of the airframe of the aircraft.
Figure 4:
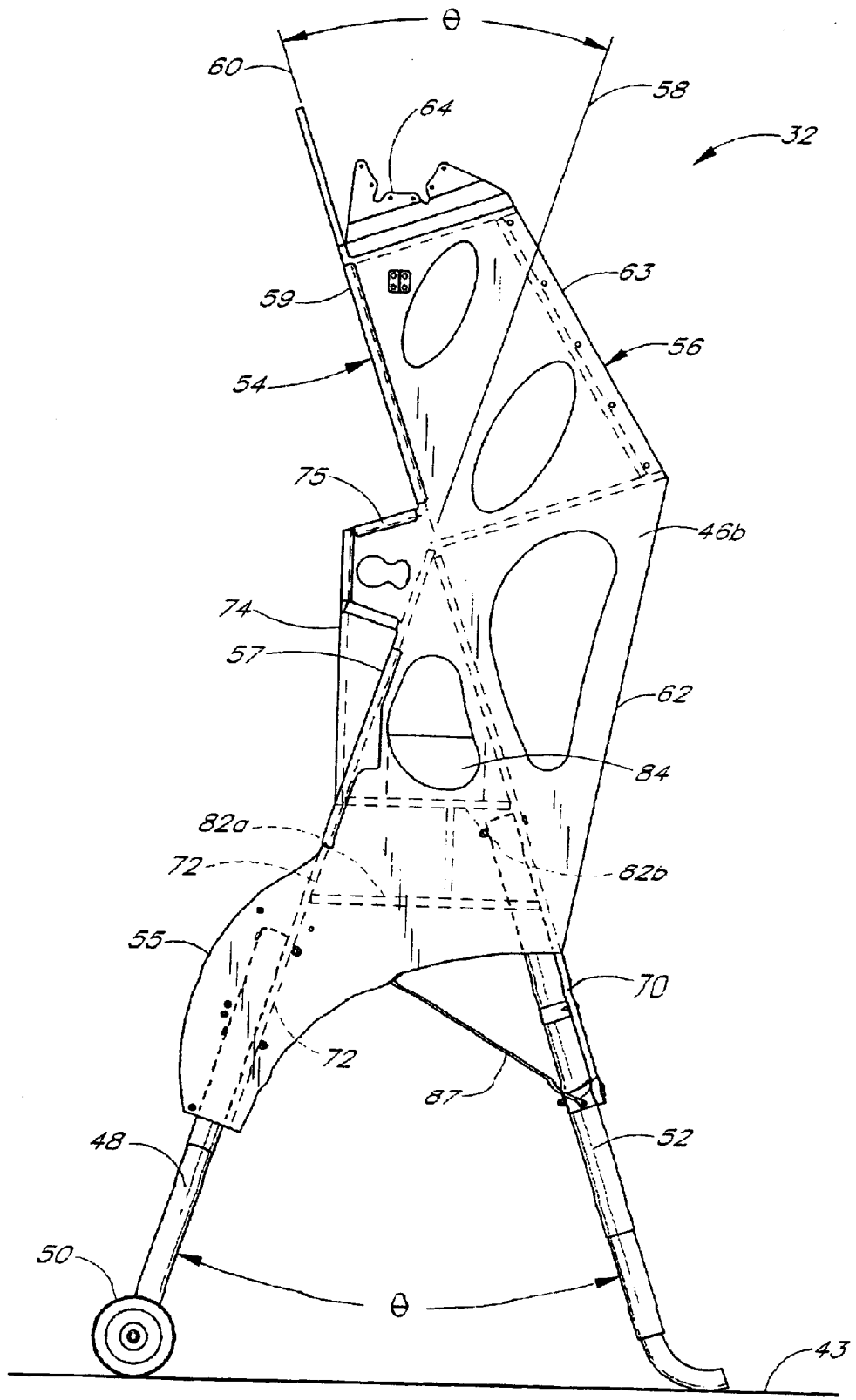
FIG. 4 is a port side elevational view of the airframe.
Figure 5:
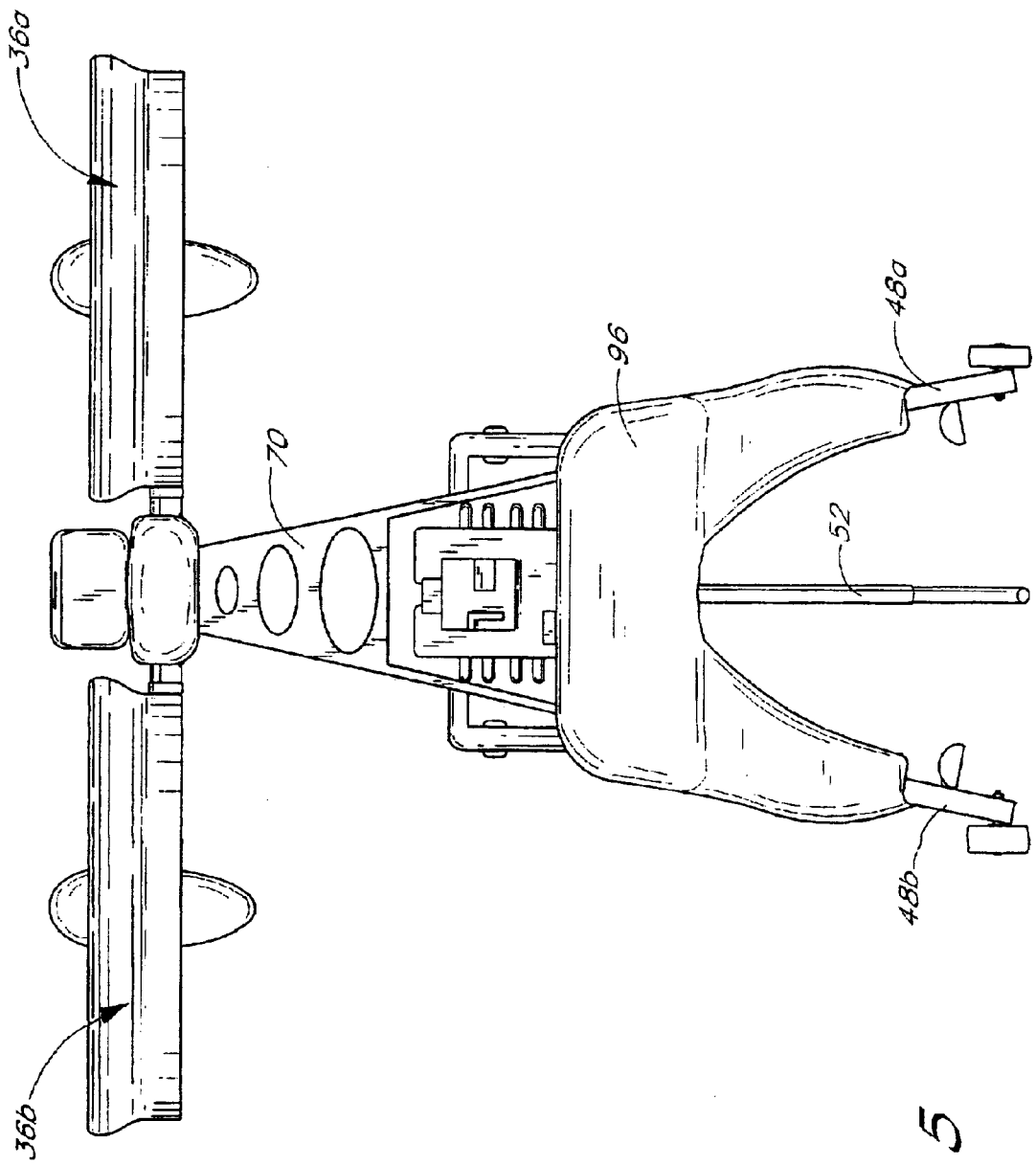
FIG. 5 is a rear elevational view of the airframe.

FIGS. 3 and 4 are front and port side elevational views, respectively, of the airframe 32 of the aircraft 30 at rest on a flat ground plane 43. FIG. 5 is a rear elevational view of the airframe 32. The airframe 32 generally comprises a plurality of structural panels that are coupled together so as to provide the airframe 32 with a generally "A"-shaped profile when viewed from the front. The "A" shape of the airframe 32 provides the aircraft 30 with a compact, solid ground base that reduces the likelihood of the aircraft toppling when parked or during transport. The "A" shape also provides the aircraft 30 with a weight distribution that advantageously positions the aircraft center of gravity 38 at a location that increases the stability of the aircraft 30 during flight, as described more fully below.

The shape of the airframe 32 may be described with respect to a medial plane 42 that extends vertically relative to the ground plane 43 and normal to a plane defined by FIG. 3. The medial plane 42 defines the centerline of the airframe 32 and is generally aligned with the medial plane of the torso of the pilot 34 when positioned on the aircraft 30, as best seen in FIG. 1. The aircraft 30 has a center of gravity ("CG") 38 that is located along the medial plane 42. When the pilot is positioned on the airframe 32, the center of gravity 38 is also located along the medial plane of the pilot's torso when viewed from the front (FIG. 1) and slightly rearward of the pilot's torso when viewed from the side (FIG. 2).

As best shown in FIG. 3, the airframe 32 is preferably configured to be symmetric about the medial plane 42. That is, the portion of the airframe 32 on the starboard outboard side of the medial plane 42 is a mirror image of the portion of the airframe on the port outboard side of the medial plane 42. As used herein, the term "outboard" refers to a direction moving perpendicularly away from the medial plane 42. The term "inboard" refers to a direction opposite the outboard direction.

As best shown in FIGS. 3 and 4, the airframe 32 includes a pair of opposed, planar side panels 46a,b (collectively referred to as "side panels 46") that define the outboard peripheral edges of the aircraft 30. The side panels 46 define opposed planes having a space therebetween that gradually reduces in width moving upwardly from the ground plane 43 to thereby provide the aircraft 30 with the generally triangular "A" shape. In the illustrated embodiment, a plurality of irregularly-shaped apertures extend through each of the side panels 46 to allow access therethrough. It will be appreciated, however, that the side panels 46 could also have uninterrupted surfaces. The side panels 46 define a pilot space 47 therebetween along the front portion of the aircraft 30. The pilot space 47 is sized to receive the torso of the pilot 34.

As best shown in FIG. 4, each of the illustrated side panels 46 defines a contoured leading edge 54 and an opposed trailing edge 56. The leading edge 54 includes a forwardly curved lower section 55 that is disposed adjacent the leg of the pilot 34 when the pilot is boarded on the aircraft 30. The leading edge 54 also includes a straight medial section 57 that defines a first axis 58 oriented at an angle relative to the vertical. A straight upper section 59 of the leading edge 54 is oriented at a diagonal relative to the straight medial section 57. The straight upper section 59 defines a second axis 60 that intersects the first axis 58. The first and second axes 58, 60 generally define the position of the aircraft legs and also outline the "A" -shaped profile of the airframe 32 when viewed from the side.

With reference to FIG. 4, the trailing edge 56 of each side panel 56 includes a straight lower section 62 that is opposed to the medial section 57 of the leading edge 54. The trailing edge 56 also includes a straight, forwardly-extending upper section 63 that is opposed to the upper section 59 of the leading edge 54. As mentioned, the side panels 46 are preferably shaped to maintain the "A" shape of the aircraft and to optimally position the center of gravity thereof. As can be seen in FIG. 4, the side panels 46 are desirably shaped to extend farther in the rearward direction than in the forward direction with respect to the intersection point between the first and second axes 58 and 60. The rearward weight distribution of the side panels counterbalances the weight of the pilot 34 when the pilot 34 boards the aircraft 30. The resulting position of the center of gravity 38 is generally near the midway point of the side profile of the aircraft, as can be seen in FIG. 2.

As best shown in FIG. 4, the upper edges of the side panels 46 are rounded so as to define a generally semi-circular seat 64 that is sized to receive and support thereon a transverse or secondary drive axle of the powertrain system.

With reference to FIGS. 4 and 5, the airframe 32 further includes a rear or trailing panel 70 that is fixedly mounted between the side panels 46. As best shown in FIG. 5, the trailing panel 70 has triangular-shape so as to fit snug between the side panels 46 and structurally maintain the "A" shape of the airframe 32. The trailing panel 70 is preferably oriented at an angle to the vertical and aligned with the second axis 60. In the illustrated embodiment, the trailing panel 70 includes a plurality of apertures extending therethrough to allow access and visibility therethrough. However, the trailing panel 70 could also define an uninterrupted surface.

As shown in FIGS. 3 and 4, the airframe 32 further comprises a flat front panel 72 that is mounted between the side panels 46 and forwardly-opposed to the rear panel 70. The front panel 72 is generally triangular-shaped so as to fit snug between the side panels 56 and to structurally support the relative positions of the side panels 56. As best shown in FIG. 4, the front panel 72 lies in a plane that is disposed at an angle relative to a plane defined by the rear panel 70. The front panel 82 is also aligned with the first axis 58.

As shown in FIG. 4, the front panel 72 and the opposed rear panel 70 define a triangular hollow volume or space therebetween. A pair of transverse support panels 82a,b are preferably mounted in the space between the front panel 72 and the rear panel 70. The support panels 82a, 82b are disposed in a horizontal orientation relative to the ground plane 43 and provide structural stability to the airframe 32. The support panels 82 are preferably used as support surfaces for storage of various devices within the airframe 32. For example, in a preferred embodiment, a battery for the engine 40 may be positioned atop the support panel 82a. An opening may be provided in either the front or rear panels 72, 70 for providing access to the storage space. In the embodiment shown in FIG. 3, an elongated door 86 is pivotably mounted on the front panel 72 so as to provide access to the space between the support panels 82a, 82b.

With reference to FIGS. 3 and 4, a back support panel 74 is disposed forward of the front panel 72 and generally rearward of the location where the torso of the pilot is positioned during flight. In the illustrated embodiment, the back support panel 74 is disposed in a vertical orientation relative to the ground plane 43. A transverse support panel 75 is interposed between the top edge of the back support panel 74 and the rear panel 70 for providing structural support therebetween.

Figure 6:
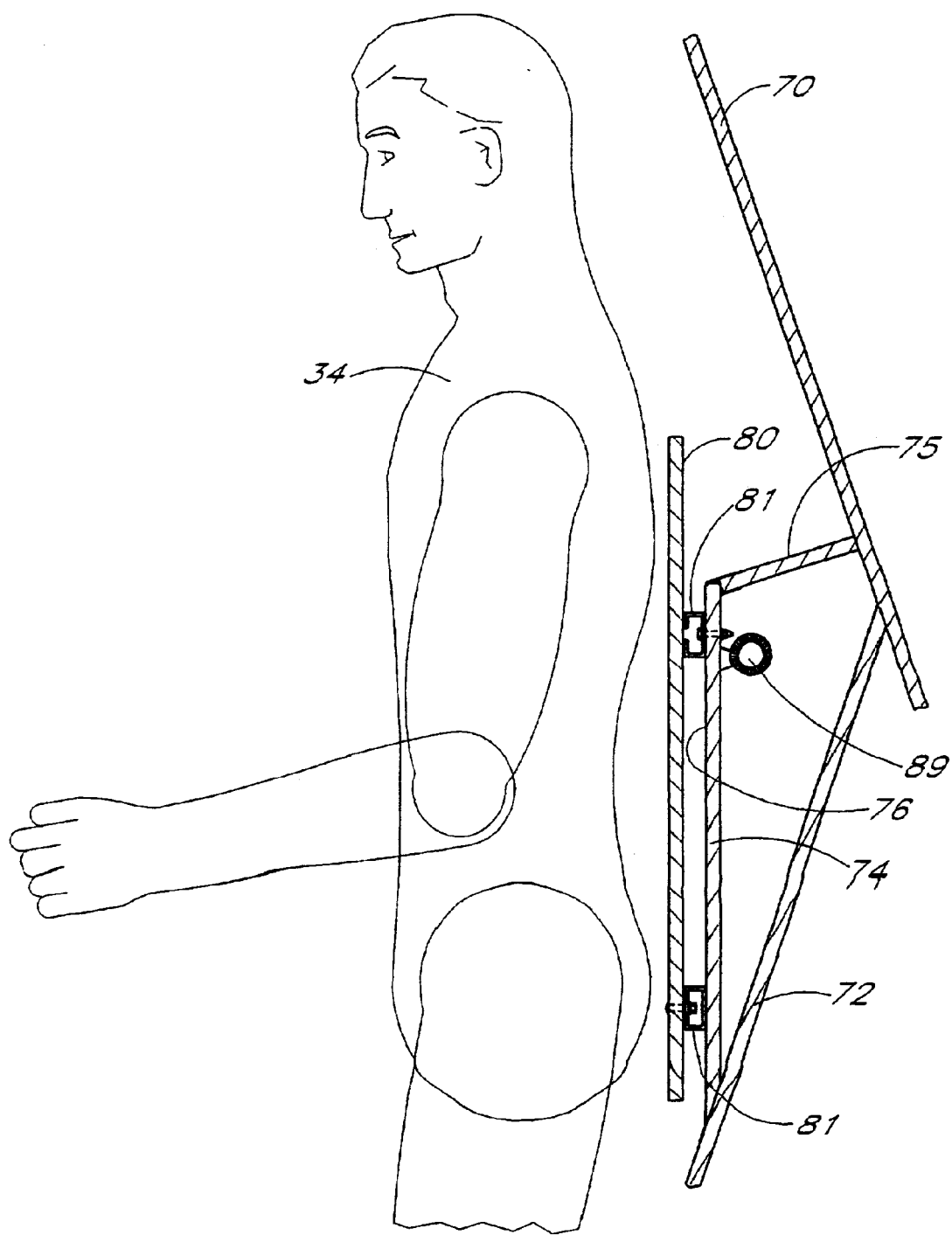
FIG. 6 is a cross-sectional view of the airframe along line 6—6 of FIG. 3 with the pilot superimposed thereon.

FIG. 6 is a cross-sectional view of the aircraft 30 along line 6—6 of FIG. 3 with an outline of the pilot 34 superimposed thereover. The back support panel 72 defines a flat front surface 76. A back support member, such as a cushion 80, is preferably mounted on the front surface 76 of the back support panel 72. The cushion 80 is preferably disposed rearward of the pilot's torso and is configured to provide support thereto during operation of the aircraft 30. For ease of illustration, the cushion 80 is shown having a flat, planar shape. However, those skilled in the art will appreciate that the cushion 80 may take on any of a wide variety of shapes and sizes that are configured to provide various degrees of support and comfort to the pilot 34.

As shown in FIG. 6, the cushion 80 is preferably coupled to at least one bracket 81. Each of the brackets 81 is elongated and extends in the inboard-outboard direction on the support panel 72. Preferably, the cushion 80 is configured to slidably move along the length of the brackets 81. The pilot 34 may slidably reposition his or her torso relative to the airframe 32 by exerting directional pressure on the cushion 80 and sliding the cushion along the brackets 81. The pilot 34 may control the aircraft 30 by shifting his or her weight using the movable cushion 80, as described in more detail below.

As shown in FIGS. 3 and 4, a pair of struts 87 preferably extend between the bottom end of the rear panel 70 and the side panels 56. The struts 87 provide additional structural support and stability to the airframe 32.

With reference to FIGS. 3 and 4, the airframe 30 preferably includes a leg support system comprised of a pair of front legs 48a,b (collectively "front legs 48") and a rear leg 52 that are disposed on the bottom of the airframe 32 in a tripod configuration. The front legs 48a,b extend downwardly from each of the leading edges 54 of the side panels 46a,b, respectively. As best shown in FIG. 3, the outboard edge of each of the front legs 48a,b is disposed substantially flush with or adjacent a plane defined by the respective side panel 46a,b so as to maintain the "A"-shaped profile of the aircraft 30. The front legs 48 define an angle β therebetween, which is preferably approximately 20–30 degrees. Additionally, as best shown in FIG. 4, each of the front legs 48a,b is positioned substantially adjacent with the first axis 58 defined by the leading edges 54 of the side panels 46a,b. A wheel 50 is preferably rotatably mounted on a bottom end of each of the front legs 48.

A single rear leg 52 extends downwardly from the rear panel 70 of the airframe 32. The rear leg 52 is preferably mounted on the inner surface of the rear panel 70 via a set of brackets. In the articulated embodiment, the rear leg 52 has a straight, elongated upper portion and a rearwardly-curved or rounded bottom portion that abuts the ground plane 43 when the aircraft 30 is at rest. The rounded bottom portion of the rear leg 52 anchors the position of the aircraft 30 when at rest. However, the rear leg 52 could also be equipped with a wheel in the same manner as the front legs 48. As best shown in FIG. 3, the rear leg 52 is aligned with the medial plane 42 so that the weight distribution of the airframe 32 is symmetric about the rear leg 52. With reference to FIG. 4, the rear leg 52 is also axially aligned with the second axis 60 so that the front and rear legs 48, 52 define an angle θ therebetween. In one embodiment, the angle θ approximately 30–40 degrees.

Figure 7:
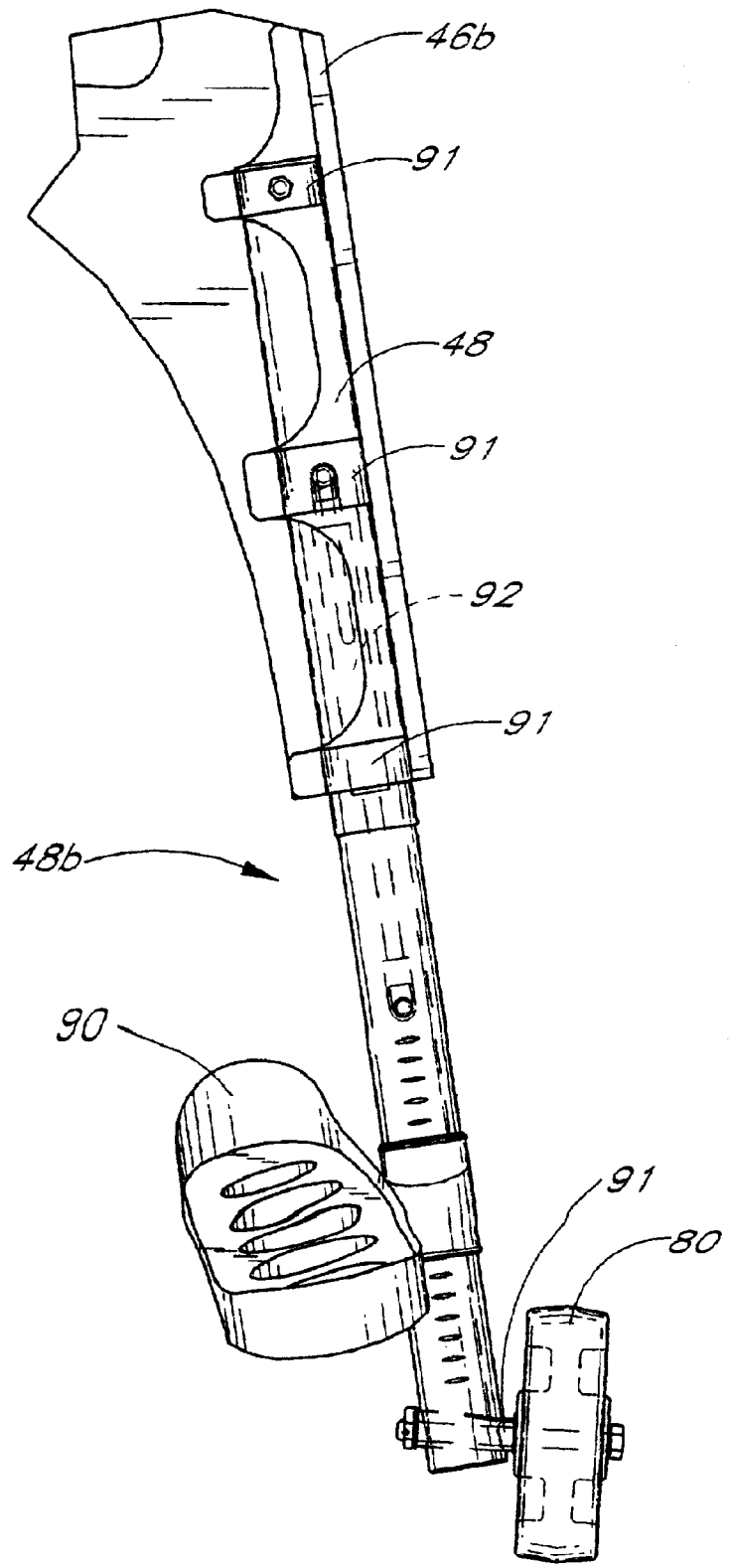
FIG. 7 is a front elevational view of a front leg of the aircraft.

FIG. 7 is cross-sectional front view of the port front leg 48*b* of the aircraft 30. The starboard front leg 48*a* is a mirror image of the port front leg 48*b*. The front leg 48 is preferably attached to an inboard surface of the side panel 46 using a plurality of clamps or mounts 91. The wheel 80 is preferably mounted on a rotatable shaft 91 that extends through a bottom end of the front leg 48. Each of the front legs 48 comprises a pair of generally hollow tubular members that are telescopically coupled to one another. Accordingly, one of the tubular members may be moved relative to the other tubular member to provide shock absorbing capabilities thereto when the legs 48 impact a surface. Toward this end, a gas spring 92 (shown in phantom lines) is preferably mounted within each of the front legs 48 to absorb loads thereon during takeoff and landing of the aircraft 30. The rear leg 52 is preferably also fitted with a gas spring in a similar manner.

With reference to FIG. 7, a foot rest 90 is mounted near a bottom end of each of the front legs 48. The foot rest 90 comprises a plate that defines a substantially flat, elongated surface that is sized and shaped to support the foot of the pilot 34 during flight. Preferably, the foot rest 90 is adjustably mounted on the front legs 48*b* to allow the vertical location of the foot rests 90 to be optimized for pilots of various heights. The starboard leg 48*b* is preferably also equipped with a foot rest 90.

In a preferred embodiment, a leg fairing 96 (FIG. 1) is attached to the side panels 46 of the airframe 32. The leg fairing 96 is preferably contoured so as to wrap around the airframe and to provide a smoothing shape to the aircraft 30 for reducing drag thereon. In the illustrated embodiment, the leg fairing 96 comprises an elongated structure having a pair of rounded leg sections 97 that are positioned adjacent the side panels 46. Each leg section 97 has a curved leading edge that slopes downwardly toward the lower end of the front legs 48 and a trailing edge that slopes upwardly toward the trailing edge of the side panels 46. As best shown in FIG. 1, the leg sections 97 of the fairings 96 flair outwardly away from the medial plane 42 of the aircraft 30. The fairing 96 may take on other shapes to vary the drag profile of the aircraft 30. Fairings may also be mounted on other locations of the airframe 30.

As mentioned, the airframe 32 is advantageously configured to support the pilot 34 in an upright or standing position. The pilot 34 boards the aircraft 34 by placing his or her feet upon the footrests 90 and positioning his or her torso in the passenger space 47. The rear torso of the pilot 34 is preferably positioned adjacent the cushion 80 on the back support panel 74. Advantageously, the tripod configuration of the front and rear legs 48, 52 provide a stable support structure for the aircraft 30 to reduce the risk of the aircraft 30 toppling during transport, take-off or landing. As mentioned, the weight of the pilot 34 counterbalances the weight distribution of the airframe 32 so that the center of gravity 38 is located at or near the midpoint of the front to rear dimension of the aircraft 30.

The airframe 32 is preferably configured to accommodate a pilot in the 95 percentile range of heights. The adjustable footrests 90 allow the pilot 34 to be positioned on the airframe 32 with his or her torso at the same position relative to the cushion 80 regardless of the height of the pilot 34. Because the control mechanisms of the aircraft 30 are also positioned relative to the cushion, the pilot's torso is always in the same location relative to the control mechanisms regardless of the height of the pilot.

The aircraft 30 is preferably sized to support an average sized human. In one embodiment, the aircraft is approximately 94 inches tall. There is a distance of approximately 102 inches between the starboard and port peripheral edges of the fan ducts 100. The aircraft 30 is approximately 19 inches deep from front to rear.

The airframe 32 is preferably manufactured of a lightweight material that is suitably strong to support the air loads that the aircraft experiences during flight. In one embodiment, the planar structural members of the airframe 30, such as the side panels 46, are comprised of a honeycomb material. The interconnecting bracketry that connect the structural members to one another is preferably manufactured of titanium, aluminum, or combinations thereof. Additional structural components may be made of aircraft grade aluminum tubing and various machined and welded aluminum parts. The fairings may be made of carbon, Kevlar, or low density foam cores or combinations thereof.

Propulsion System

Figure 8:
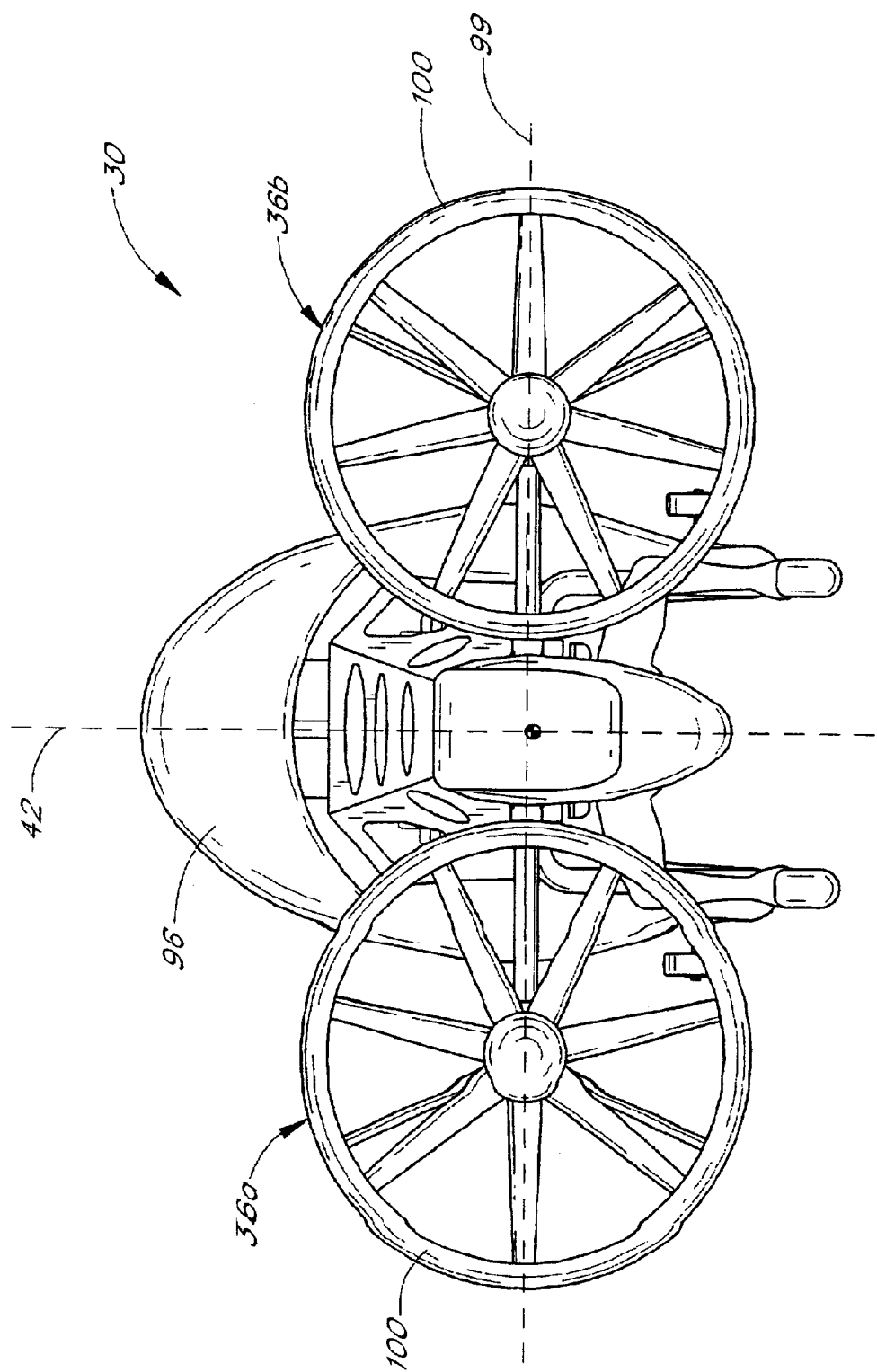
FIG. 8 is a top plan view of the aircraft.

FIG. 8 is a top plan view of the aircraft 30 showing the aircraft propulsion system which in a preferred embodiment comprises a pair of rotary fan assemblies 36*a,b* (collectively referred to as "fan assemblies 36") that are rotatably mounted on the top end of the aircraft 30. The fan assemblies 36 are desirably mounted on opposite outboard sides of the medial plane 42 such that the fan assemblies 36 are positioned symmetrically thereabout. In a default position, the fan assemblies 36 are positioned to spin within a common, horizontal plane. However, the fan assemblies may be collectively or differentially tilted about a common axis 99 to vary the direction of thrust and thereby control the aircraft during flight. The axis 99 is positioned directly above the center of gravity 38 so that the fan assemblies do not generate a moment thereabout when the fan assemblies are in the default position.

Figure 9:
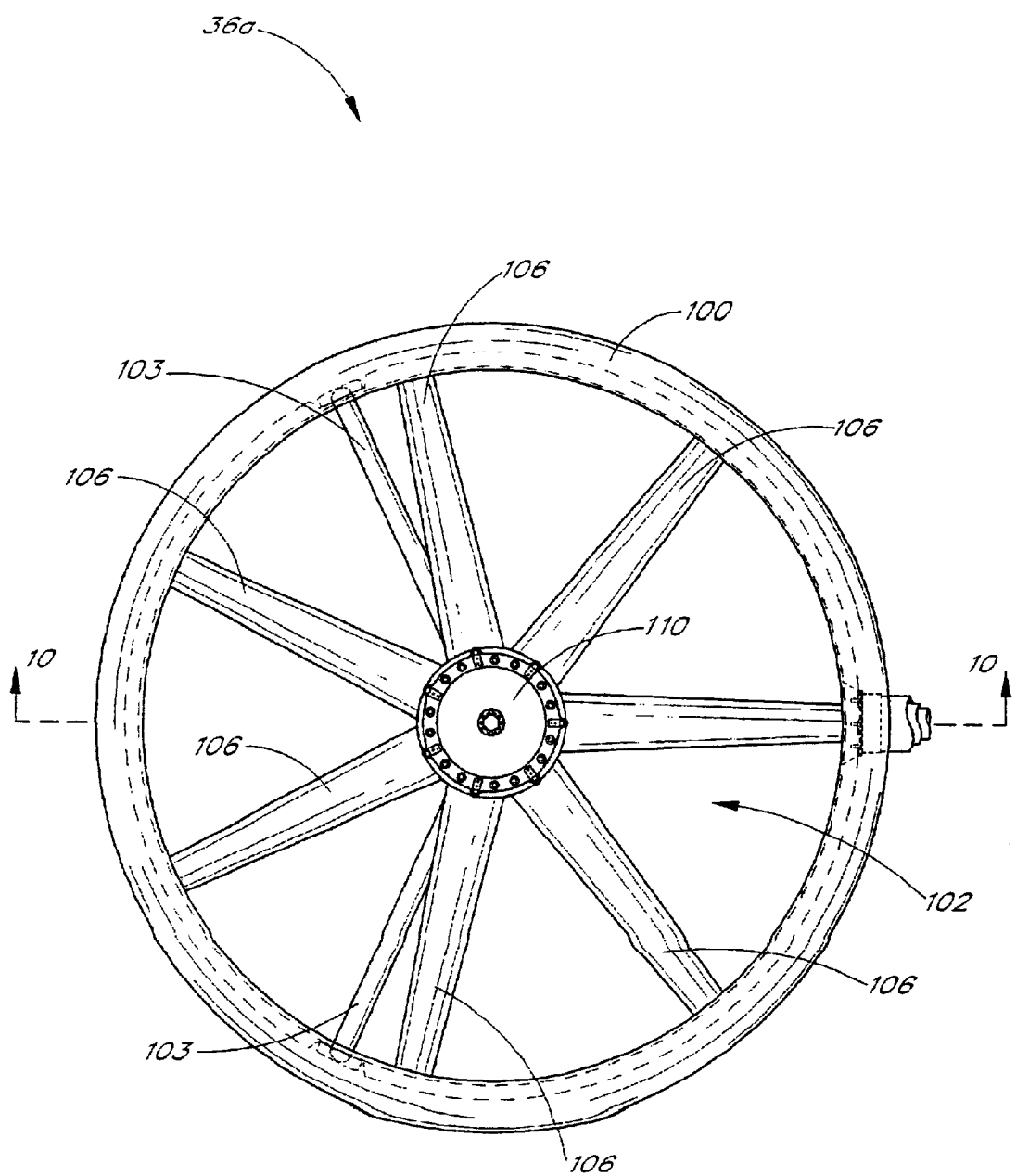
FIG. 9 is a top plan view of a single fan assembly of the aircraft.
Figure 10:
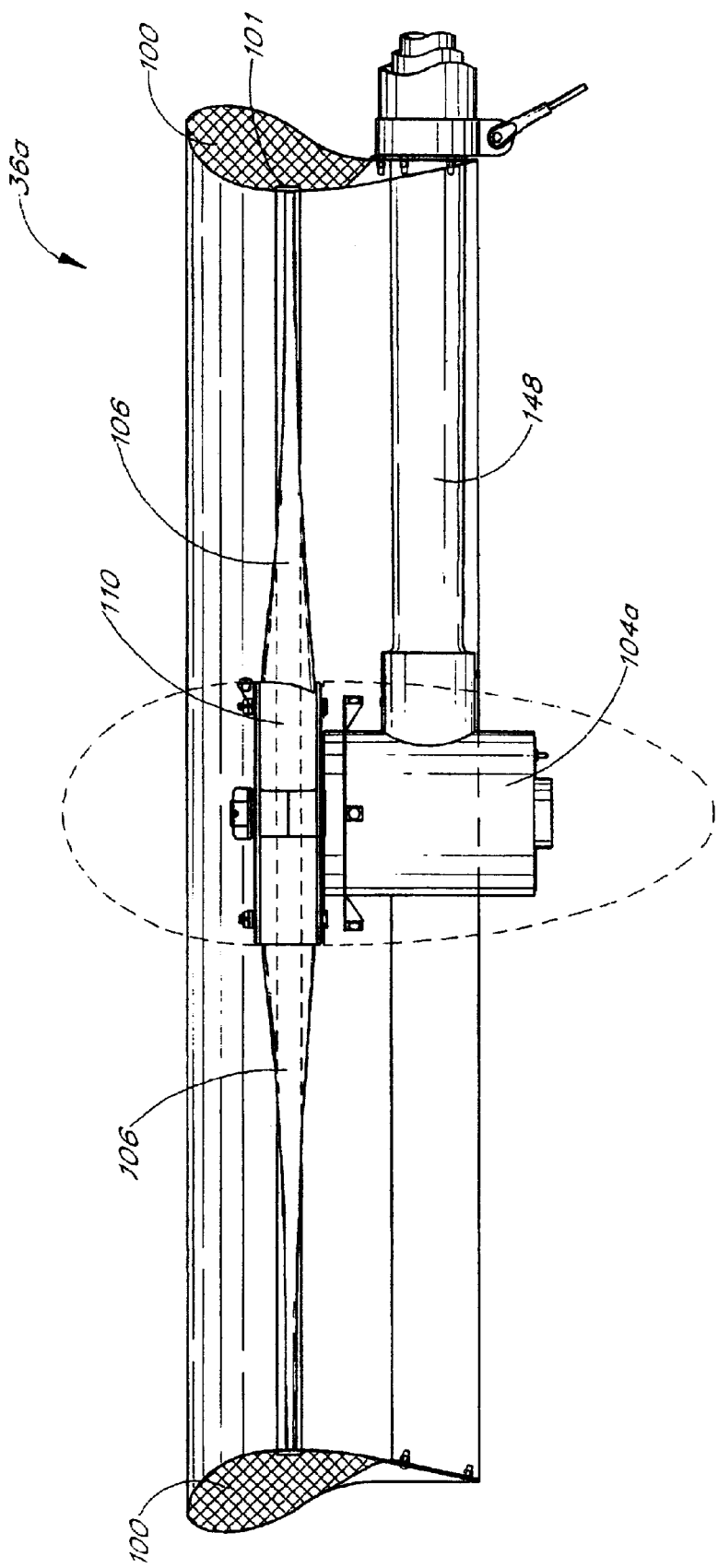
FIG. 10 is a cross-sectional view of the fan assembly of FIG. 9.

FIGS. 9 and 10 are top plan and cross-sectional views, respectively, of the starboard fan assembly 36*a*, which is a mirror of the port fan assembly 36*b*. The following description of the starboard fan assembly 36*a* is therefore also applicable to the port fan assembly 36*b*. The fan assembly 36*a* comprises an annular fan duct 100 and a fan 102 rotatably mounted therein. A pair of radially-extending struts 103 and tubular housing 148*a* (FIG. 12) couple the fan duct 100 to an outboard gear box 104*a* (FIG. 10) that is disposed below the centerpoint of the fan duct 100. As best shown in FIG. 10, the fan duct 100 has a cross-sectional shape corresponding to the shape of an airfoil. This reduces drag on the fan assembly 100 during flight and also reduces the amount of noise generated by the fans 102. The shape of the fan ducts 100 also increases the efficiency of the fans 102. The airfoil shape creates a low pressure region at the upper tips of the fan ducts 100 which causes the fans 102 to produce more thrust during operation.

The fans 102 preferably each spin in an opposite rotational directions during operation of the aircraft 30. Because the fans 102 are disposed symmetrically with respect to the medial plane, the opposite spin directions of the fans 100 advantageously result in a zero net torque by the fans 102 on the aircraft 30 and no net gyroscopic effect by the fans 102.

Each fan 102 preferably comprises a set of fan blades 106 that extend radially outward from a central fan hub 110. The fan hub 110 is mounted atop the outboard gear box 104a and is coupled to the powertrain system through the outboard gear box 104a, as described in detail below. In the illustrated embodiment, the fan 102 includes seven fan blades 106 that extend radially outward from the fan hub 110 and each fan blade 106 is spaced from an adjacent fan blade by an equal angular distance of approximately 51°.

Figure 11:
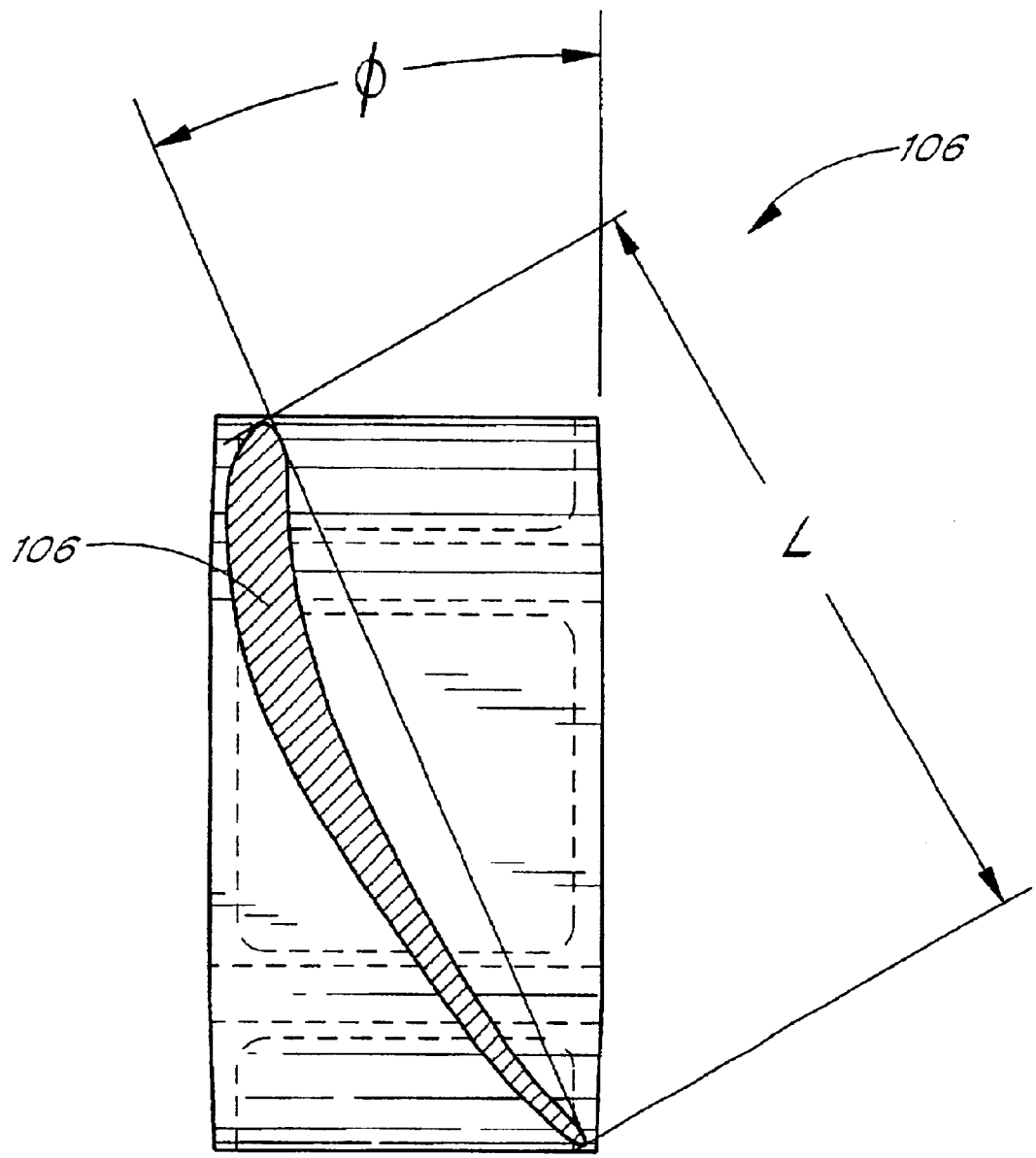
FIG. 11 is a cross-sectional view of a fan blade of the fan assembly.

The fans 102 are configured to spin within the fan hubs 110 to thereby generate a propulsion force in a direction parallel to the spinning axis of the fans 102. Toward this end, each of the fan blades 106 has a cross-sectional shape that is selected to generate an airflow when the fans 102 spin. FIG. 11 is a cross-sectional view of a fan blade 106 at the location where the blade 106 is mounted to the fan hub 110. Each fan blade 106 has a chord length L and a pitch angle $\phi$. In a preferred embodiment, the chord length L is approximately 3.5 inches and the pitch angle $\phi$ is approximately 24° at the location where the fan blade 106 is mounted to the fan hub 110. The fan blade 106 then gradually transitions to a chord length L of approximately 2 inches and a pitch angle $\phi$ of approximately 7° moving radially outward from the fan hub 110. The fan 102 preferably has a radius of approximately 19 inches from the center of the fan hub 110 to the tip of the fan blade 106.

The fan blades 106 preferably have a fixed pitch. This increases the reliability of the fans 102 by reducing the number of moving parts thereon with respect to variable-pitch fans. The pitch of the fan blades 106 is preferably nominally optimized for an operational range between cruise and hover.

The fan duct 100 defines an inner diameter that is larger than the diameter of the fan 102. Preferably, there is approximately a 0.030 inch radial clearance between the inner surface of the fan duct 100 and the outer radial tip of the fan blades 106. As shown in FIG. 10, an annular strip 101 of material is located on or within the inner radial surface of the duct 100 along the periphery of the fan blades 106. The strip 101 is desirably positioned where the outer radial tip of the fan blades spins nearest the fan duct 100. That is, the strip 101 is located in the same plane in which the tips of the fan blades 106 rotate.

The clearance distance between the fan blades 106 and the inner surface of the fan ducts is preferably as small as possible to increase the efficiency of the fan 102. However, a smaller clearance introduces a greater risk that the fan blades 106 will collide with the duct 100 if the duct 100 is deformed. Advantageously, the strip 101 preferably comprises a relatively soft material, such as balsa wood, that will deform if contacted by the tips of the fan blades 106. The strip 101 will therefore not impede rotation of the fan blades 106 if the blades 106 collide with the duct 100. The strip 101 desirably has a radial thickness of approximately 0.25 inch so that it comprises merely a small portion of the duct 100.

The fan blades 106 are preferably manufactured of a material configured to withstand air loads generated during propulsion of the aircraft 30. In a preferred embodiment, the fan blades 106 are made of a robust chopped-fiber reinforced nylon which is not affected by UV radiation. Such a material is capable of absorbing traumatic events that may occur during flight, such as impact with birds and other objects, without failing catastrophically. The fan ducts 100 may be manufactured of a composite material, such as carbon-Kevlar disposed over a foam core.

As best shown in FIGS. 1 and 2, a preferred embodiment of the aircraft 30 includes a rounded centerbody 112 that extends over and under the fan hub 110 of the fan assembly 36. The centerbody 112 is circular when viewed from the top and are substantially ovoid when viewed from the side. The centerbodies 112 increase the aerodynamic efficiency of the aircraft 30.

The fans 102 preferably normally operate at a rotational rate in the range of approximately 4,400 RPM to 5,500 RPM. These rotational speeds maintain the outer tips of the fan blades 106 below the sonic range. Such a range of operation produces sufficient propulsion while also producing relatively low noise levels. The fans 102 preferably generate a collective lift of at least approximately 900 pounds at maximum rotational speeds.

Powertrain System and Powerplant Systems

Figure 12:
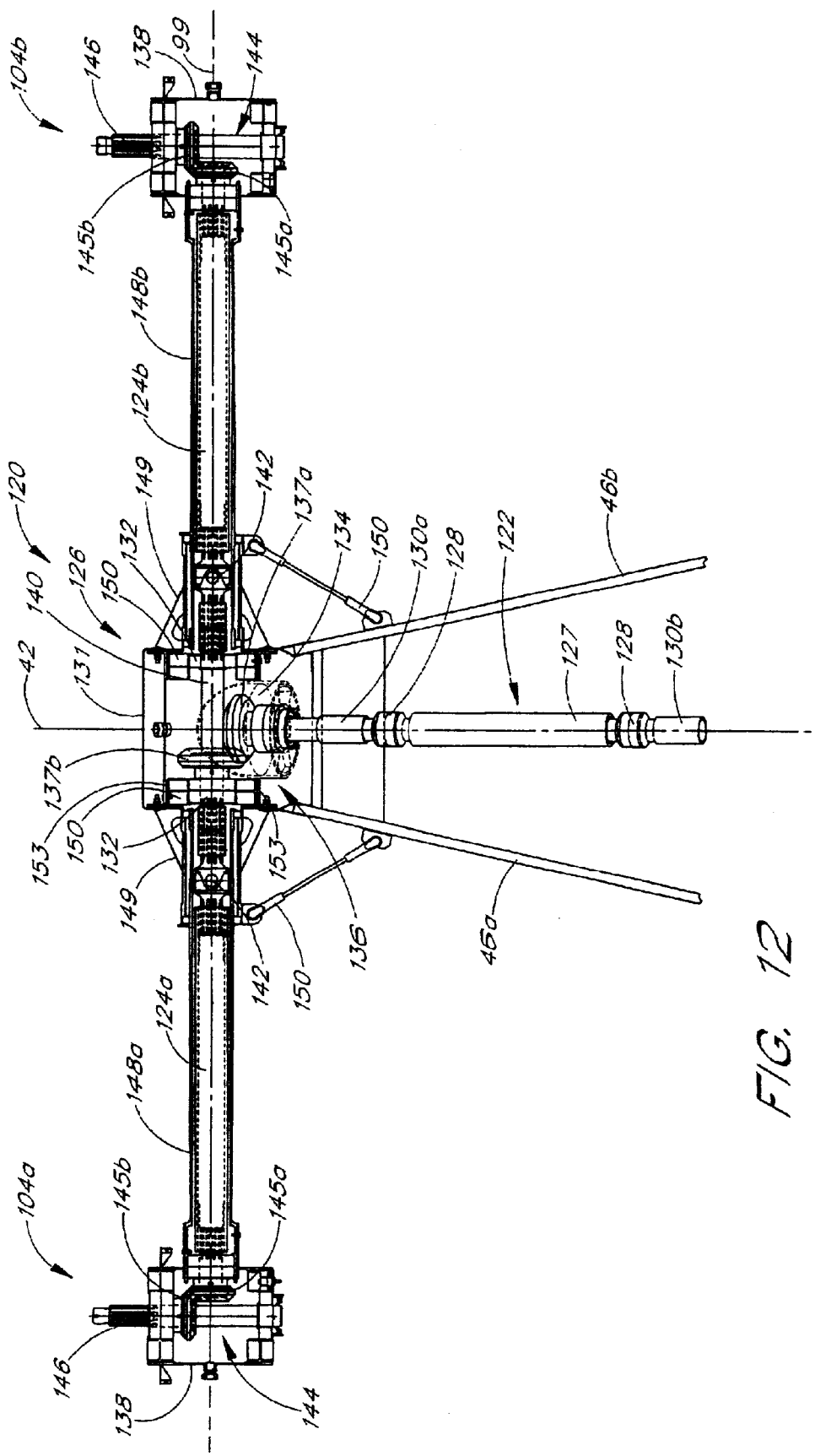
FIG. 12 is a front elevational view of a powertrain system of the aircraft.
Figure 13:
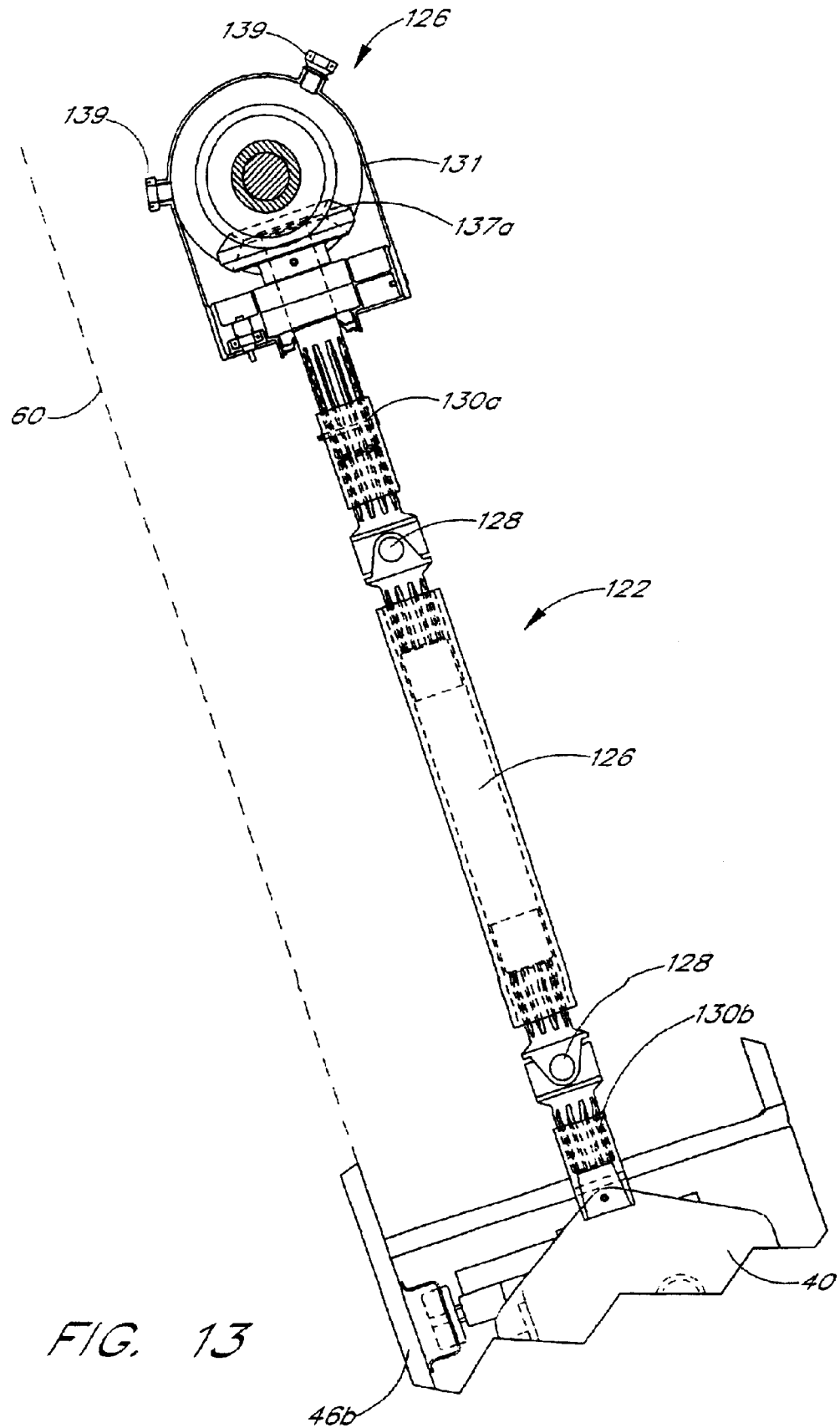
FIG. 13 is a side elevational view of the powertrain system of FIG. 12.

FIGS. 12 and 13 are front and side elevational views, respectively, of the aircraft powertrain system which comprises a set of drive shafts that drivingly couple the engine 40 to the fan assemblies 36. The powertrain system preferably includes a main drive shaft 122 that is directly coupled at a bottom end to the engine 40 (FIG. 13). A pair of starboard and port secondary drive shafts 124a,b (collectively "secondary drive shafts 124") are disposed transverse to the main drive shaft 122 and drivingly coupled thereto via a central gear box 126. The secondary drive shafts 124 drivingly couple the main drive shaft 122 to the starboard and port fan assemblies 36a,b via a pair of starboard and port outboard gear boxes 104a,b, respectively. The secondary drive shafts 124 are co-axially aligned with the tilting axis 99 of the fan assemblies 36.

With reference to FIGS. 12 and 13, the main drive shaft 122 is connected at a first end to the engine 40 (FIG. 13) and at a second end to the central gear box 126 that is disposed at the upper end of the airframe 30. In the illustrated embodiment, the main drive shaft 122 is comprised of several components including an elongated torque tube 127 having universal joints 128 mounted on opposite ends thereof. The universal joints 128 couple the torque tube 127 to a pair of shafts 130a,b (collectively referred to as "shafts 130") on either end of the torque tube 127. The shaft 130a is drivingly attached to a gear assembly within the central gear box 126, as described more fully below. The shaft 130b on the bottom end of the torque tube 127 is drivingly attached to an output shaft of the engine 40. A standard SAE spline assembly is preferably used to couple the shafts 130 and the torque tube 127 to the universal joint 128. In a preferred embodiment, the universal joints 128 operate at a zero offset angle. However, the universal joints 128 may also operate at small angles produced by air loads during flight.

As best shown in the front view of FIG. 12, the main drive shaft 122 defines an axis that is preferably disposed within the medial plane 42 of the aircraft 30. As mentioned above, the aircraft center of gravity 38 is also disposed within the medial plane 42. With reference now to the side view of FIG. 13, the main drive shaft 122 is further oriented such that an axis defined by the main drive shaft 122 is disposed at an angle relative to the vertical. In a preferred embodiment, the main drive shaft 122 is disposed in a parallel relationship with the second axis 60 defined by the leading edges 54 of the airframe side panels 46. The main drive shaft 122 is therefore also positioned in a generally parallel relationship with the rear leg 52 (FIG. 4).

As mentioned, the airframe 32 has a rearward weight distribution that counterbalances the weight of the pilot 34 when the pilot 34 boards the aircraft 30 so that the center of gravity is positioned generally midway of the front to rear dimension of the aircraft 30. The aforementioned orientation of the main drive shaft 122 is selected to evenly distribute the weight of the powertrain system between the front and rear of the aircraft 30. The front-to-rear angled orientation of the main drive shaft 122 allows the engine 40 to be mounted toward the rear of the aircraft 30, which counterbalances the weight of the forwardly-positioned pilot 34. The fans 102 are positioned directly over the center of gravity.

With reference again to FIGS. 12 and 13, the central gear box 126 comprises a central housing 131 having a pair of opposed apertures 132 on outboard sides thereof. A central aperture 134 extends through a bottom side of the central housing 131 for receipt of the main drive shaft 122. The central housing 131 encloses a gear assembly 136 comprised of a pair of spiral bevel gears 137*a,b* that are mounted in a meshed relationship with one another and are preferably configured to rotate along axes that are disposed in a perpendicular relationship. The upper end of the main drive shaft 122 is coupled to the bevel gear 137*a* for driving the bevel gear assembly 136. The dual bevel gear configuration preferably provides a 1:1 power transfer ratio between the gears 137*a,b,* which provides for an efficient and reliable operation. It will be appreciated, however, that the number and types of gear configurations may be varied within the central gear box 126.

With reference to FIG. 13, at least one inspection or breather plug 139 is preferably removably mounted on the central housing 131 of the central gear box 126. The breather plug 139 may be removed to provide maintenance personnel with inspection access to the internal gear assembly 136, such as through the use of a borescope. Furthermore, the central gear box 126 is preferably equipped with oil chip and temperature sensors (not shown), as will be known to those skilled in the art. Such sensors provide early warning of pending or developing temperature or friction problems. The gear box 126 may also be equipped with vibration detectors to provide early warning of undesired vibration, such as vibration above a threshold value.

With reference again to FIG. 12, the secondary drive shafts 124 are transversely disposed with respect to the main drive shaft 122. That is, the secondary drive shafts 124 extend in an outboard direction away from the medial plane 42 and toward the outboard gear boxes 104*a,b*. Preferably, the secondary drive shafts 124*a,b* are each coupled at inboard ends to a co-axial central shaft 140 via pair of universal joints 142. The central shaft 140 extends through the central gear box 126 through the outboard apertures 132. The central shaft 140 is coupled to the bevel gear 137*b* so that the bevel gear 137*b* rotatably drives both the central shaft 140 and the attached secondary drive shafts 124. As mentioned above with respect to the main drive shaft 122, the universal joints preferably operate at a zero offset angle, although they may be configured to reliably operate at angles of relatively small values.

With reference to FIG. 12, the starboard and port outboard gear boxes 104*a,b* are disposed on starboard and port outboard ends of the secondary drive shafts 124*a,b,* respectively, and below the fan assemblies 36. The outboard gear boxes 104 each comprise a box-like outer housing 138 having an inboard aperture dimensioned to receive the secondary drive shafts 124 therethrough. A bevel gear assembly 144 comprised of a pair of coupled bevel gears 145*a,b* is disposed within each of the outboard gear boxes 104. The gear assembly 144 is preferably configured similarly to the central gear assembly 136 in that the rotational axes of the gears 145*a,b* are disposed normal to one another. The bevel gears 145*a* are drivingly coupled to the secondary drive shafts 124 through a spline assembly. Each of the bevel gears 145*b* also is drivingly coupled to an upwardly extending fan shaft 146 that drives each of the fan assemblies 36. The gear assemblies preferably transfer rotational power from the secondary drive shafts 124 to the fan shafts 146 according to a 1:1 power transfer ratio.

With reference to FIG. 13, the secondary drive shafts 124 are preferably enclosed by a pair of starboard and port elongate, tubular housings 148*a,b* (collectively referred to as "tubular housings 148"). The outboard ends of the tubular housings 148 are rigidly connected to the outer gear housings 138. The tubular housings 148 are preferably journaled within the central gear box 126 via a pair of annular bearing assemblies 150. The bearing assemblies 150 allow the tubular housings to be rotated about the axis 99 when a torque is applied. The outer gear housings 138 and the attached fan assemblies 36 also rotate or tilt about the axis 99 when the tubular housings are rotated. The fan assemblies 36 may thus be reoriented by rotating the tubular housings 148 to thereby tilt the fan assemblies 36 about the transverse axis 99 and provide directional control of the aircraft during flight.

The tubular housings 148 and the gear box housings 131, 138 collectively comprise a housing assembly for the secondary drive shafts 124 of the aircraft powertrain system. The housing assembly is preferably entirely supported by the airframe 32 via the seats 64 on the side panels 46 and a pair of struts 151 that connect the side panels 46 to a pair of rigid flanges 149. Advantageously, the housing assembly 128 and the airframe 32 effectively support all airloads and lifting loads on the aircraft 30 so that the main and secondary drives shafts 122, 124 do not experience any airloads or lifting loads during flight. The housing assembly is desirably manufactured of a high-strength material configured to withstand the airloads and lifting loads generated during flight, such as titanium, aluminum, or combinations thereof.

The main and secondary drive shafts 122, 124 are preferably manufactured of a material that is configured to withstand the operational loads. Applicant has observed that woven carbon-Kevlar is a suitable material for the drive shafts. In a preferred embodiment, the ratio of Kevlar to carbon is optimized to provide the drive shafts with load absorbing capabilities such that the shafts absorb engine pulses and such pulses are not transferred to the gear boxes. This reduces wear on the gear mechanisms to improve the reliability of the aircraft. The use of a composite material allows for the use of components of reduced weight and mass, such as small-diameter drive shafts, with low moments of inertia. The components of the drive train system are less resistant to changes in rotation to provide for quick throttle response.

With reference to FIG. 12, the outer and central gear boxes 104, 126 preferably each utilize a unique gear assembly system that facilitates adjustment of the backlash between the gears. The gear assembly systems will be described with respect to the gear 137*b* of the central gear box 126, although it is preferably utilized in each of the gear boxes 104, 126. The bearing assembly 150 preferably comprise a pair of bearings that are journaled within a disk or end plate 153 that is threaded into the gear box housing 130. The bearing assembly 150 is in turn coupled to the central shaft 140 to relative sliding movement therebetween along the axis of the central shaft 140. The gear 137*b* is also fixedly mounted to the central shaft 140, such as through a press-fit. The end plate 153, bearing assembly 150, central shaft 140, and gear 137*b* are thus coupled to one another in a manner that allows the components to rotate relative to one another but prohibits the components from sliding relative to one another in a direction parallel to the axis of the shaft 140. Translation of the gear 137*b* in a direction parallel to the axis of the central shaft 140 is therefore directly coupled to translation of the end plate 153. As the end plate 153 moves into or out of the housing 130, the gear 137b also moves with the end plate 153 in a direction parallel to the axis of the central shaft 140.

The movement of the gear 137b may be calibrated with respect to the threaded rotation of the endplate 153 so that the position of the gear 137b relative to the gear 137a may be adjusted a predetermined distance by turning the endplate 153. An operator may adjust the relative positions of the gears 137, and the resulting gear backlash, by simply rotating the endplate 153. Preferably, each gear in the gear assemblies of the aircraft utilize the configuration described above. In a preferred embodiment, each radian (or fractional portion thereof) of rotation of the endplate moves the gear by approximately 0.002 inch.

Figure 13A:
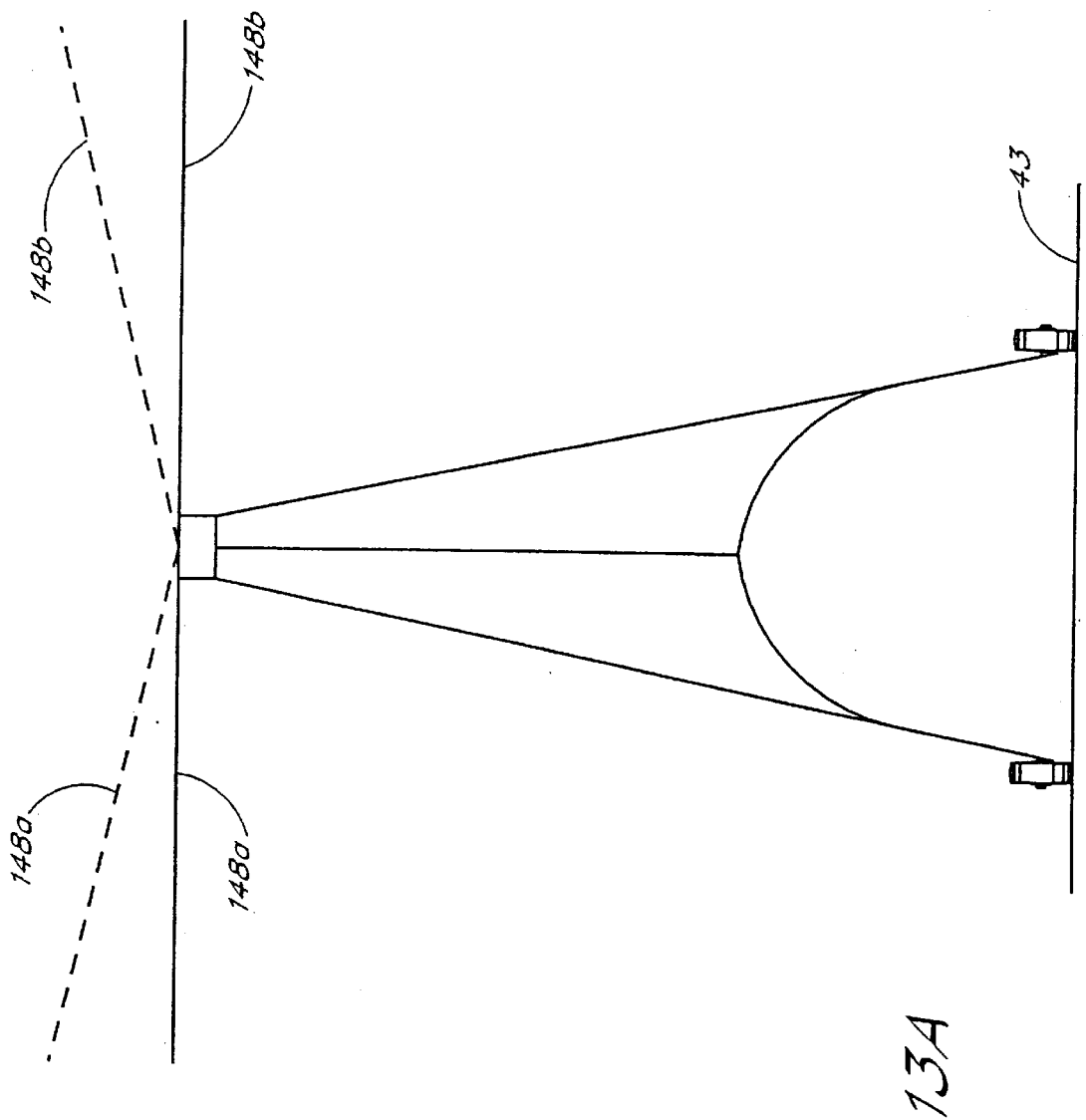
FIG. 13A is a schematic front view of the aircraft showing the aircraft dihedral effect that occurs during flight.

FIG. 13a is a schematic front view of the aircraft 30. When the aircraft 30 is not in operation, the tubular housings 148 are preferably oriented relative to the airframe 32 such that the tubular housings 148a and 148b are aligned along a common axis and exhibit no dihedral. The tubular housings 148 are preferably slightly flexible so they bend when the fan assemblies produce lift as shown in phantom lines. The tubular housings 148a and 148b thus provide dihedral with respect to one another when the aircraft 30 is in flight, which improves the lateral stability of the aircraft.

Figure 14:
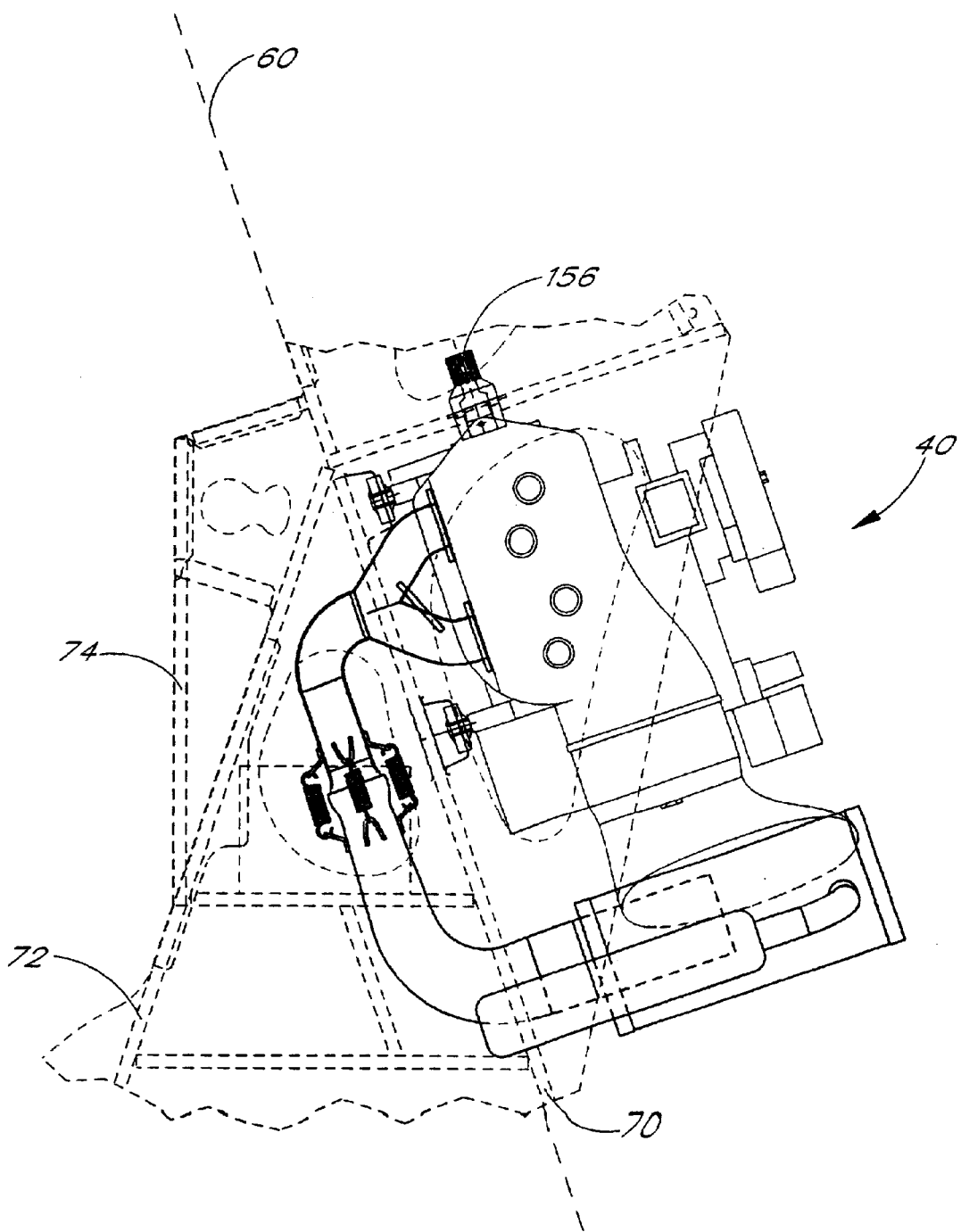
FIG. 14 is a side elevational view of the engine used to power the aircraft.

With reference now to FIG. 14, there is shown an enlarged side plan view of the powerplant system of the aircraft 30. In a preferred embodiment, the powerplant system comprises an internal combustion engine 40 having an output drive shaft 156 that is coupled to the main drive shaft 122 of the powertrain system using an SAE spline connection to provide power thereto. As best shown in FIGS. 2 and 14, the engine 40 is preferably mounted on the airframe 32 just rearward of the rear panel 70 and between the side panels 46. The engine 40 is preferably positioned slightly below the torso level of the pilot. Desirably, the engine 40 is positioned in a generally offset vertical orientation such that the output drive shaft 156 is aligned in a parallel relationship with the second axis 60.

Preferably, the engine 40 is directly coupled to the main drive shaft 122 without the use of a clutch therebetween. The fans 102 thus begin to spin as soon as the engine is activated. When the engine 40 is not operating, the level of play in rotation of the fans 102 is proportional to the level of backlash in the gear assemblies 136, 144. The pilot 34 may easily monitor the drivetrain system by attempting to spin the fans 102 when the engine is off. If the play in the fans 102 is excessive then there may be excessive wear in the drivetrain.

In a preferred embodiment, the engine 40 comprises a four cylinder, two cycle engine that is nominally rated at approximately 120–130 horsepower. Two spark plugs and one or more electronically-operated fuel injectors are preferably coupled to each cylinder of the engine 40. The engine 40 also preferably includes dual CDI ignitions and dual electronics spark-advance timing, and dual electronic fuel pumps that feed each of the fuel injectors. Each of the electronic fuel pumps are preferably coupled to one of a pair of fuel manifolds and the fuel tank. A pair of primary and secondary exhaust manifolds are also coupled to the engine 40. In one embodiment, the engine weighs approximately 124 pounds and produces approximately 1 horsepower per pound. The aforementioned engine 40 preferably uses a mixture of standard automobile gasoline fuel and synthetic oil or mineral oil. Applicant has determined that a 100:1 ratio mixture of gasoline to synthetic oil is a suitable mixture for the engine 40. A 50:1 ratio mixture of gasoline to mineral oil is also a suitable mixture for the engine 40.

Figure 15:
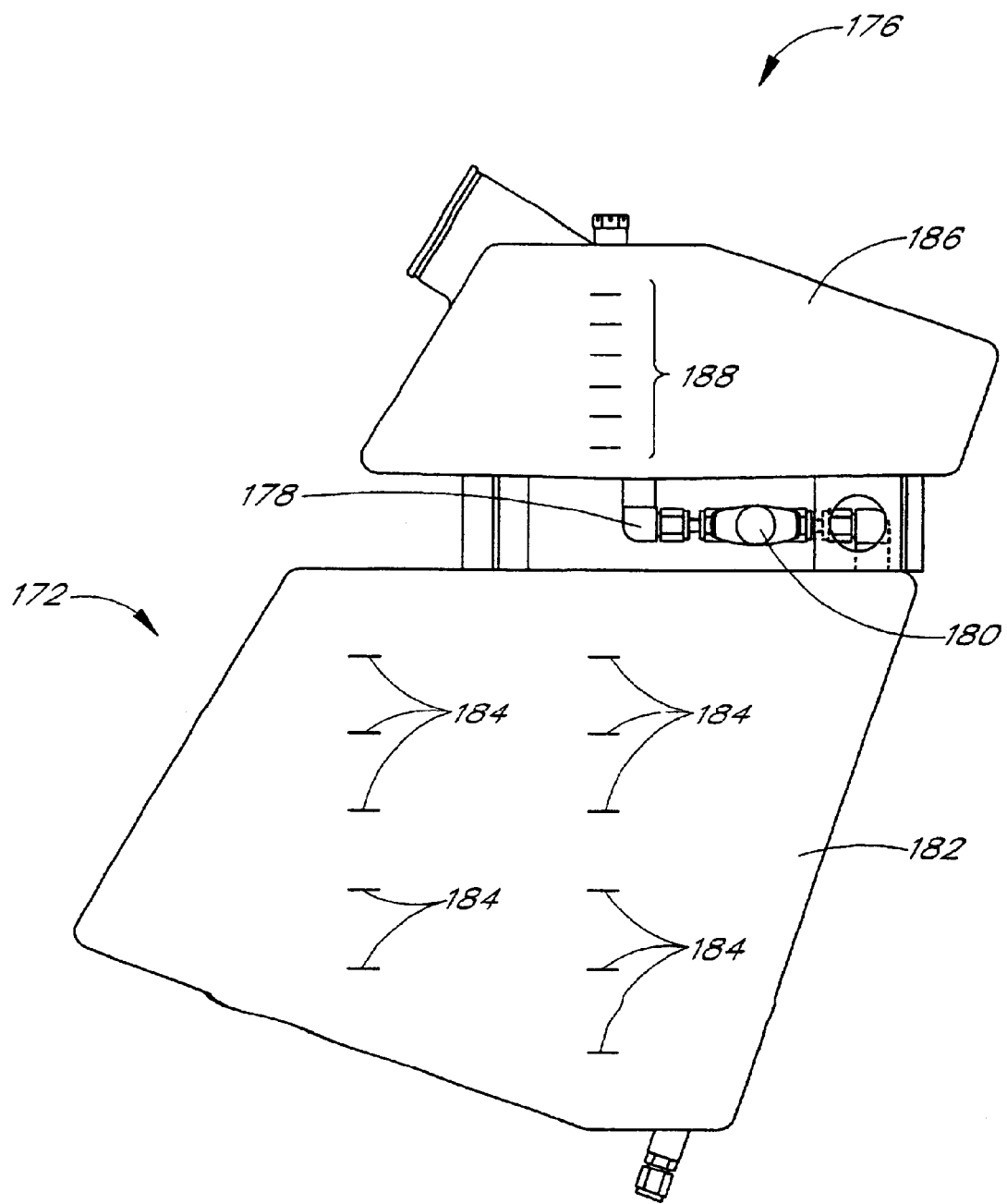
FIG. 15 is a side elevational view of an oil tank and fuel tank used with the aircraft.

FIG. 15 shows a side elevational view of a preferred fuel supply system that is used with the aircraft 30. The system comprises at least one fuel tank 172 and one oil tank 176. Preferably, the fuel tank 172 and the oil tank 176 are mounted to the airframe 32 above the engine 40 and behind the pilot's head. The oil tank 176 is preferably coupled to the fuel tank 172 via an oil line comprised of a flow tube 178 that provides a passageway for oil to flow from the oil tank 176 into the fuel tank 172 via a gravity feed. A valve 180 is preferably mounted along the flow tube 178 to allow an operator to control the flow of oil into the fuel tank 172. Additionally, a filter, such as a permeable membrane, is preferably mounted along the flow tube to intercept any undesired particulates in the oil.

In a preferred embodiment, the fuel tank 172 comprises a transparent container 182 having a plurality of graduated markings 184 thereon. The markings 184 are positioned on the container 182 to indicate the current volume of fuel remaining within the container 182. Desirably, a second set of markings 184 are configured to indicate the volume of fuel required to completely fill the container 182. For example, if the container 182 holds one gallon of fuel, the fuel level within the container 182 will be located at a marking 184 which indicates "1 gallon." For a 10 gallon tank, the fuel level is also located at "9 gallons" for the second set of markings, indicating that 9 gallons of fuel are required to completely fill the container 182. The position of the markings 184 on the container 182 may be determined through routine experimentation. The markings 184 are preferably divided into even increments of volumetric fuel levels, although the increments may vary widely. Additionally, the particular units of fuel volume could also vary.

The oil tank 176 preferably comprises a transparent container 186 having graduated markings 188 thereon. The markings 188 are preferably arranged to indicate the current volume of oil within the containers 186 in the manner described above with respect to the fuel tank 172.

The mixing of the gas and oil is preferably performed during refueling, which is advantageously facilitated by using the transparent fuel and oil tanks 172, 176 and the graduated markings 184, 188 thereon. An operator may easily determine the volume of fuel necessary to fill the fuel tank 172 by reading the second set of graduated markings 184. The operator then opens the valve in the flow tube 178 to allow oil to flow into the fuel tank 172. The particular volume of oil to be transferred is dependent upon the remaining volume of fuel in the fuel tank 172. Advantageously, the volume of oil released from the oil tank 176 may be monitored using the graduated markings 188. After the desired amount of oil is added, the fuel tank 172 is then filled with fuel.

In operation, the engine 40 is activated so that it transfers power to the main drive shaft 122 of the powertrain system via the engine output shaft 156. As mentioned, the main drive shaft 122 is coupled at one end to the bevel gear 137a of the central gear assembly. The central gear assembly 136 transfers power from the main drive shaft 122 to the secondary drive shafts 124, which are drivingly coupled to the gears 145a of the outboard gear assemblies 144. The fan shafts 146 are then driven by the outboard gear assemblies 144 so that the fans 102 begin to spin. The rotational speed of the fans 102 is controlled by varying the throttle level of the engine 40. Upon spinning of the fans 102, the fan assemblies 36 generate a thrust force that provides lift to the aircraft. As described below, the direction of fan thrust may be varied to control the aircraft during flight.

Control and Stability System

Figure 16:
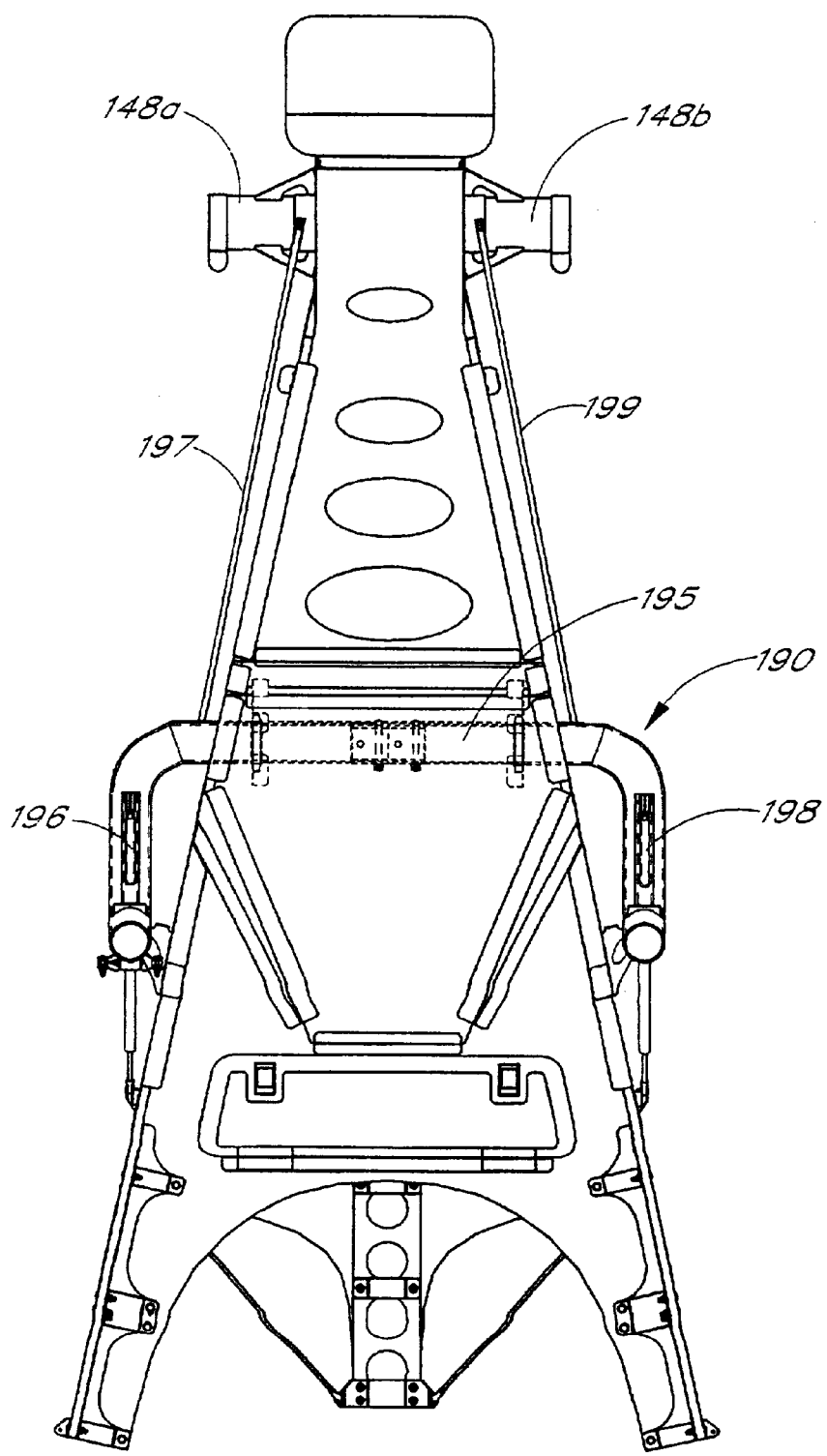
FIG. 16 is a front elevational view of the aircraft showing various components of the control and stability system.
Figure 17:
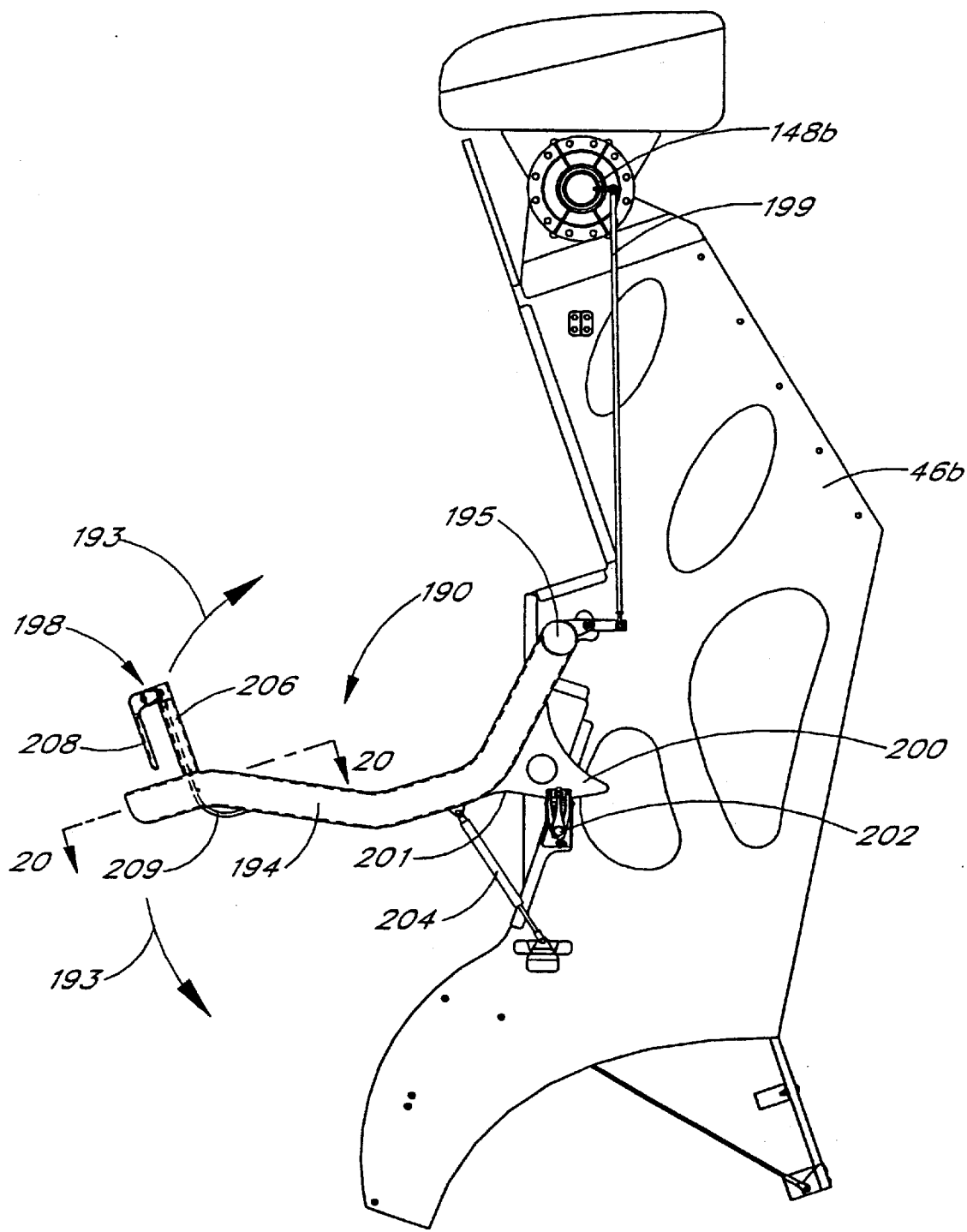
FIG. 17 is a port side elevational view of the aircraft.
Figure 18:
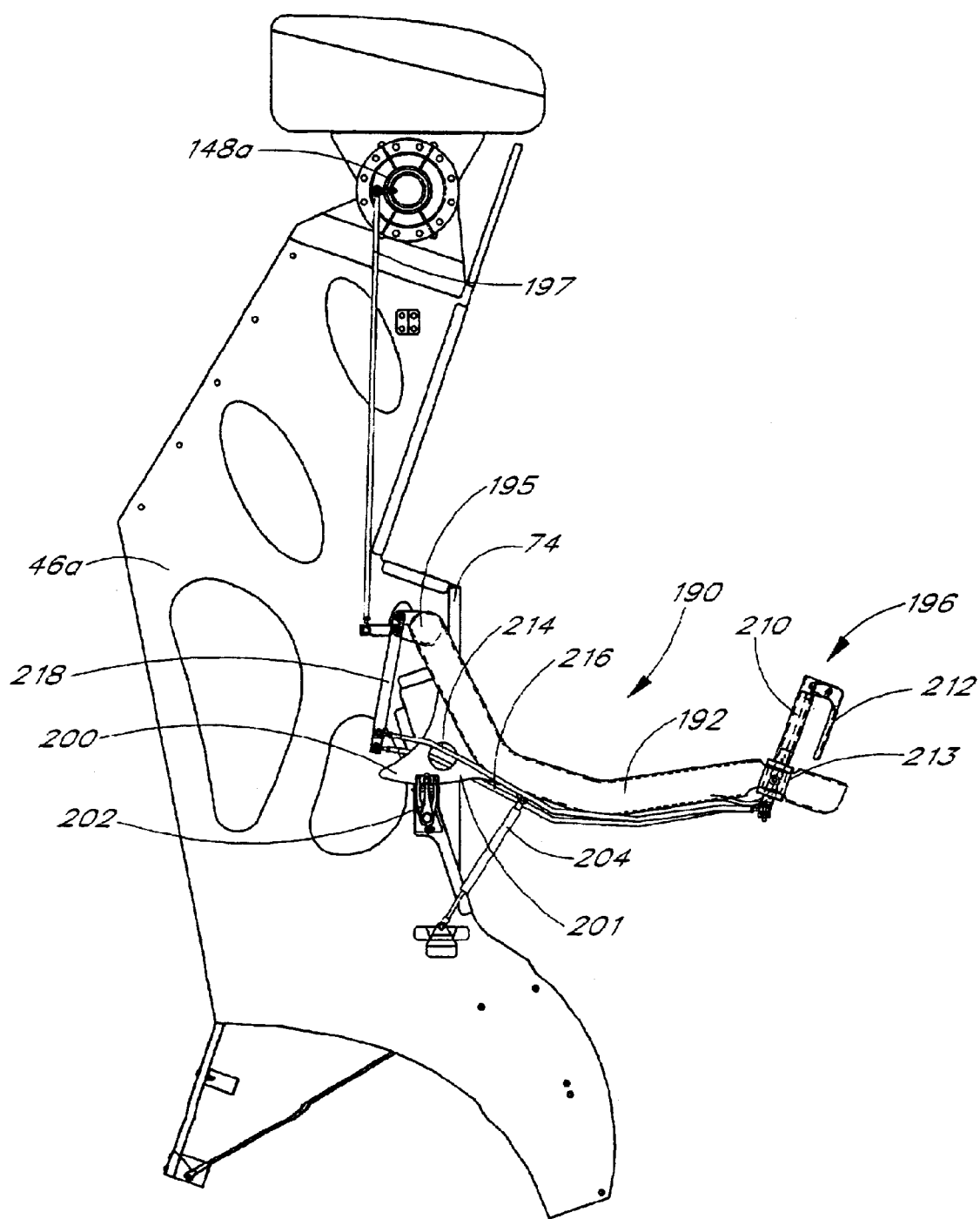
FIG. 18 is a starboard side elevational view of the aircraft.

FIG. 16 is a front elevational view of the aircraft 30 showing various components of the control and stability system. FIGS. 17 and 18 are port and starboard side elevational views, respectively, of the aircraft 30. Preferably, the control and stability system provides the pilot 34 with three-axis translational control and two-axis attitude control over the aircraft 30 during flight. The three-axes translational control pertains to the forward/backward directions, the starboard and port lateral directions, and the upward/downward directions. The two-axes attitude control pertains to roll and yaw.

Forward and backward translational control of the aircraft 30 is preferably accomplished by collectively tilting the fan assemblies 36 in a forward or backward direction. Lateral translation of the aircraft 30 is preferably achieved by inducing a rolling moment to the airframe 32 through weight-shifting of the pilot. Vertical translation is preferably achieved by varying the engine throttle. Roll control is preferably achieved by shifting the pilot's weight on the airframe. Lastly, aircraft yaw is preferably achieved by differentially tilting the fan assemblies 36. The pilot 34 may easily accomplish these functions by shifting his or her weight and manipulating the main control member 190 and/or the hand control mechanisms 196, 198, as described more fully below.

With reference to FIG. 16, the control and stability system preferably comprises a u-shaped tubular main control member 190 and a plurality of control linkages attached thereto that mechanically couple the main control member 190 to the fan assemblies 36. Preferably, the pilot 34 may vary the orientation of the fan assemblies 36 by lifting and/or lowering the main control member 190, as described more fully below. A set of starboard and port-side control mechanisms 196 and 198, respectively, are mounted near opposite ends of the main control member 190 for providing additional control over the orientation of the fan assemblies 36 and over the level of engine throttle, as described more fully below.

With reference to FIGS. 16–18, the main control member 190 comprises an elongated, contoured tube having two bends that form opposed starboard and port arms 192 and 194, respectively, and a straight, elongated connecting section 195 therebetween. The main control member 190 is rotatably coupled to the airframe 32 at a location rearward of the back support panel 74 such that connecting section 195 extends along the outboard direction. As best shown in FIGS. 17 and 18, the starboard and port arms 192, 194 extend forwardly relative to the airframe 32 along opposite sides of the pilot mounting space. The main control member 190 is preferably journaled to be rotatable about an axis extending through the connecting section 195. The main control member 190 may thus be rotated about the connecting section 195 by lowering or lifting the arms 192, 194, as exhibited by the arrows 193 in FIG. 17.

As shown in FIGS. 16–18 a pair of starboard and port elongated push rods or control linkages 197 and 199 are mechanically connected at a lower end to each of the starboard and port arms 192, 194, respectively. The control linkages 197 and 199 are also connected at an upper end to the inboard ends of the starboard and port tubular housings 148a,b, respectively. The control linkages 197, 199 thereby provide a mechanical link between the main control member 190 and the tubular housings 148 that enclose the secondary drive shafts 124. The pilot may provide a torque to the tubular housings 148 by lifting or lowering the starboard and port arms 192, 194, as described in more detail below.

As best shown in FIGS. 17 and 18, a fin or triangular plate 200 extends rearwardly from the starboard and port arms 192, 194. Alternatively, a single plate 200 could extend rearwardly from any location on the main control member 190, such as from the center thereof. Each of the plates 200 has a curved bottom edge 201 that slidably mates with a caliper 202 mounted on each of the side panels 46. The bottom edge 201 of each plate 200 slides within the calipers 202 as the main control member 190 is lifted or lowered. The main control member 190 is lifted or lowered by exerting sufficient force thereon to overcome the friction force between the plate 200 and the calipers 202. In one embodiment, the calipers 202 retain sufficient friction on the plates 200 to maintain the position of the main control member 190 when it is released by the pilot 34.

In another embodiment, the calipers 202 are mechanically coupled to the hand control mechanism 196, 198. In a default state, the calipers 202 maintain a constant friction engagement with the plates 200 to inhibit or prevent movement of the main control member 190. The pilot may manipulate the starboard and/or port side control mechanisms 196 and 198 to release the calipers 202 from engagement with the plates 200 so that the main control member 190 may be moved. This is preferably accomplished by the pilot squeezing a grip on at least one of the control mechanisms 196 or 198, as described more fully below. Alternatively, a single, rather than multiple, plate-caliper may be coupled to one or both of the control mechanisms 196, 198.

Preferably, the calipers 202 or plate 200 include a detent interface therebetween that limits the rotational range of motion of the main control member 190. For example, the caliper and plate interface may prevent the main control member 190 from being pushed downward beyond a predetermined rotational position or pulled upward beyond a predetermined rotational position. This desirably prevents the pilot 34 from inadvertently tilting the fan assemblies 36 to an undesired or unsafe orientation, which may cause the aircraft to accelerate too rapidly or to achieve too great of an airspeed.

With reference to FIGS. 17 and 18, a pair of rate dampeners, such as gas springs 204, are coupled to the main control member 190 for limiting the rate at which the control member 190 may be rotatably moved. In the illustrated embodiment, one end of each gas spring 204 is attached to a bottom edge of each of the starboard and port arms 192, 194. The other end of each gas spring 204 is attached to the respective side panel 46. The gas springs 204 are stretched or compressed as the main control member 190 is lifted or lowered, respectively. Preferably, the gas springs are configured to resist stretching or compressing beyond a predetermined threshold rate to thereby inhibit the pilot from moving the main control member 190 and the fan assemblies 36 too quickly during flight, which may cause the aircraft to accelerate or maneuver at an unsafe rate. Advantageously, the resistance level of the gas springs 204 may be varied to set the resistance to movement of the main control member 190. The behavior of the aircraft 30 may thus be customized for different training situations, such as by making the aircraft 30 more docile or more aggressive depending on the skill level of the pilot.

With reference to FIGS. 16 and 17, the port-side control mechanism 198 comprises a stick 206 and a grip 208 that is pivotably mounted to the upper end of the stick 206. The stick 206 extends upwardly from a forward end of the port arm 194, preferably at a location where the pilot 34 may reach by extending his or her arm. The stick 206 is preferably coupled to the throttle of the engine 40 in a well known manner, such as, for example, via a throttle cable 209. The pilot 34 preferably rotates the stick 206 to translate the cable and thereby vary the throttle of the engine 40. In one embodiment, two complete revolutions of the stick 206 varies the throttle approximately ±4,000 rpm. The rotational rate of the fan blades 106 increases proportionally as the engine throttle is increased. The pilot may thereby use the portside control mechanism 198 to control the amount of thrust generated by the fan assemblies 36.

Figure 20:
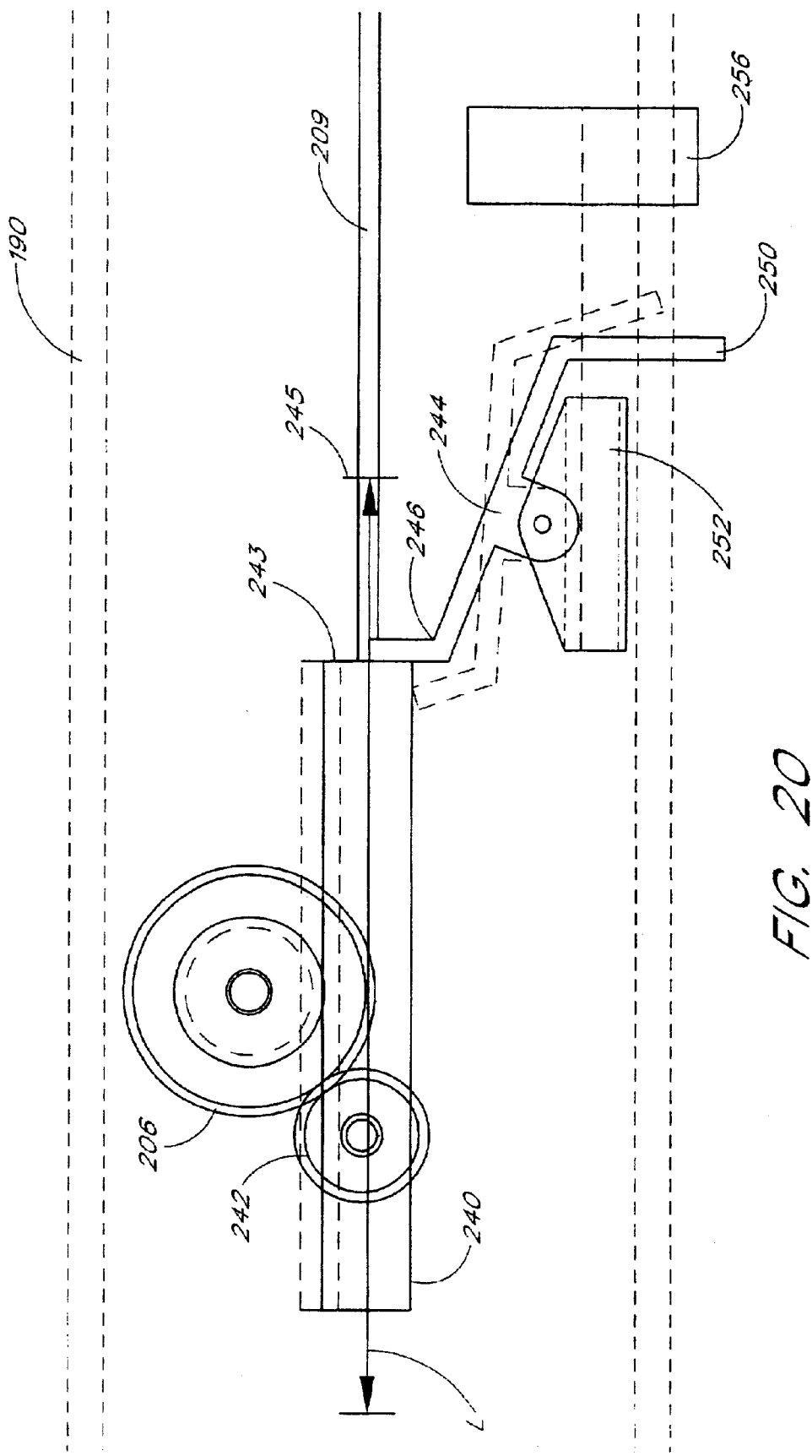
FIG. 20 is a cross-sectional view of a control arm of the aircraft along line 20—20 of FIG. 17.

FIG. 20 is a top-down cross-sectional view of a section of the port arm 194 along line 20—20 of FIG. 17. The aircraft 30 preferably includes a throttle interlock system that is configured to prevent the pilot from accidentally reducing the throttle of the engine below a safe flight level. The throttle interlock system includes a rack and pinion system comprised of a rack 240 and pinion 242 that are coupled to the stick 206. The pinion 242 is configured to rotate in response to rotation of the stick 206. As the pinion 242 rotates, it translates the rack 240 over a linear translational path L. The rack 240 is connected at a distal end 243 to the throttle cable 209 so that linear movement of the rack 240 is directly translated into linear movement of the throttle cable 240 along the path L. The throttle level of the engine 40 is a function of the position of the rack 240. Preferably, the engine throttle is at a minimum level, or "ground throttle," when the distal end 243 of the rack 240 is fully translated to a location 245 along the path L.

With reference to FIG. 20, an actuator, such as a levered detent member 244, is movably coupled to the port arm 194. The detent member 244 has a first abutment end 246 that may be moved into and out of an engagement relationship with the distal end 243 of the rack 240, as described below. A second end 250 of the detent member 244 protrudes outwardly from the port arm 194. The detent member 244 is pivotably mounted to a flight idle adjustment member 252 that may be linearly translated in a direction parallel to the path L through rotation of a knob 256.

With reference to FIG. 20, the detent member 244 is movable between an engaged position and a disengaged position. In the engaged position, the abutment end 246 intersects the translational path L of the rack 240 so that the abutment end 246 acts as a detent to inhibit movement of the rack 240 toward the position 245. Thus, when in the engaged position, the detent member 244 engages with the rack 240 and prevents the engine throttle from being reduced below a certain level. In a non-engaged position (shown in phantom), the abutment end 246 is positioned outside of the translational path L. The knob 256 may be rotated to vary the location at which the abutment end 246 intersects the translational path L of the rack 240.

At startup of the engine 40, the detent member is in the disengaged position and the distal end 243 of the rack 240 is at the position 245, corresponding to ground throttle. As the pilot 34 increases the throttle, the distal end 243 of the rack 240 passes beyond the abutment end 246 of the detent member 244 so that the detent member 244 snaps into the engaged position. The detent member 244 thereby prevents the throttle from being reduced below a predetermined level, referred to herein as the "safe throttle level."

The safe throttle level preferably corresponds to the minimum throttle at which the fans 102 will provide some percentage (preferably 70%–90%) of lift required to keep the aircraft at hover, which is based on the power characteristics of the aircraft and the pilot's weight. In one embodiment, the safe throttle level is the particular minimum throttle level sufficient to keep the aircraft 30 at hover for the particular weight of the pilot. In a preferred embodiment, the knob 256 is provided with markings that correspond to the weight of the pilot. Prior to flight, the pilot 34 sets the knob 256 to his or her weight so that the safe throttle level is set at a calibrated, predetermined RPM value that is configured to provide sufficient lift for the particular weight of the pilot. This system greatly reduces the likelihood of the pilot 34 inadvertently reducing the throttle below a safe level during flight. The pilot 34 may disengage the detent member 244 and override the minimum safe throttle level by inwardly pressing the second end 250 of the detent member 244 to move the detent member to the disengaged position. Advantageously, this requires the pilot to use two hands, one to press the detent member 244 and the other to rotate the distal end 243 of the rack 240 beyond the detent end 246 of the detent member 244.

The aforementioned throttle system increases the safety of the aircraft 30. Once the pilot has increased the throttle beyond a certain level and achieved flight, he or she is required to affirmatively actuate the detent member 244 prior to reducing the throttle below the safe throttle level. This eliminates the likelihood of the pilot 34 accidentally reducing the throttle to an unsafe level and inadvertently initiating an unsafe descent of the aircraft.

Figure 19:
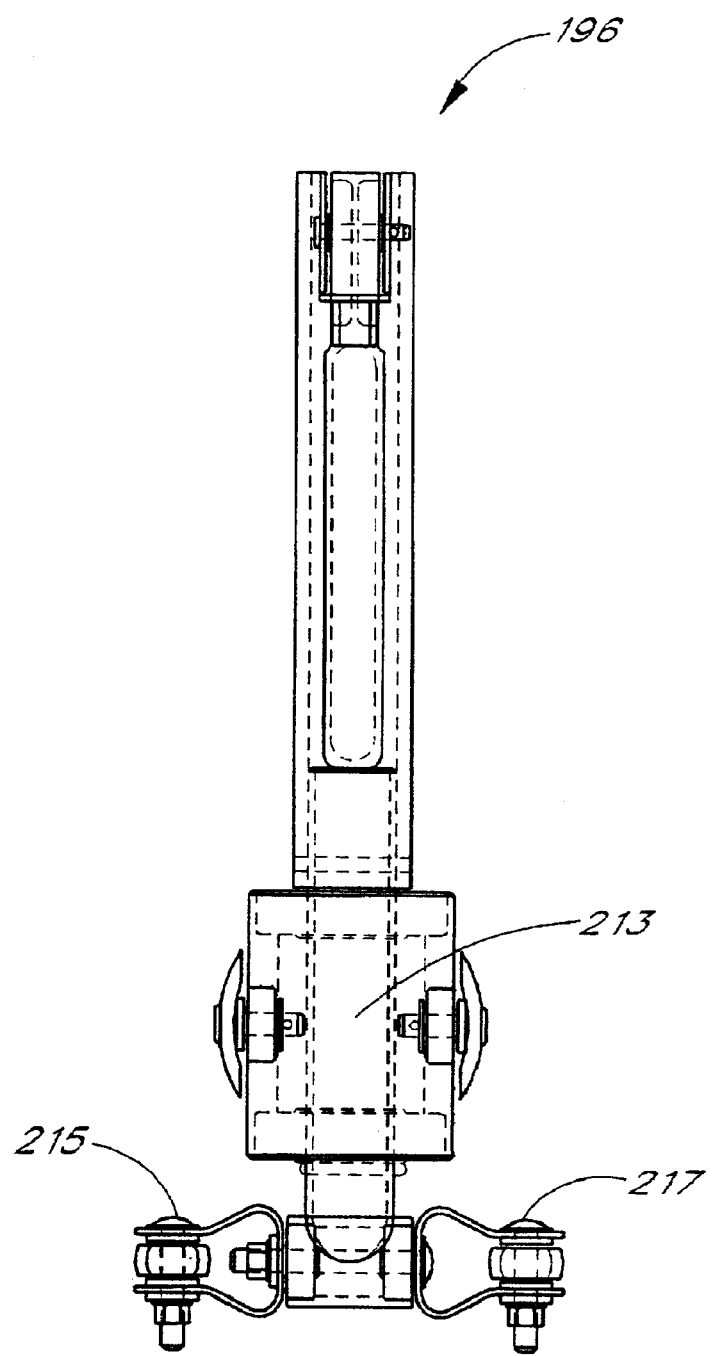
FIG. 19 is a front elevational view of a control stick used with the aircraft.

With reference to FIGS. 16 and 18, the starboard-side control mechanism 196 comprises a stick 210 and a grip 212 pivotably mounted thereto. FIG. 19 is an enlarged front elevational view of the starboard-side control mechanism 196. The starboard-side control mechanism 196 preferably includes a gimbaled base member 213 that is rotatably and pivotably mounted within the starboard arm 192. The gimbaled base member 213 allows the starboard-side control mechanism 196 to be rotated about an axis extending through the stick 210 and to also be rearwardly and forwardly tilted about base member 213.

With reference to FIG. 19, a pair of opposed brackets 215, 217 are disposed on a bottom end of the starboard-side control mechanism 196 below the gimbaled base member 213. As best shown in FIG. 18, a pair of first and second elongated bell cranks 214, 216 are mechanically coupled at respective forward ends to the brackets 215, 217. The elongated bell cranks 214, 216 extend along the bottom edge of the starboard arm 192 toward the rear of the starboard arm 192. A rearward end of the first bell crank 214 is mechanically connected to a starboard linkage arm 218 that extends upwardly and is mechanically attached to the bottom end of the starboard control linkage 197. As mentioned above, the upper end of the starboard control linkage 197 is connected to the starboard tubular housing 148a. The bell crank 214, linkage arm 218, and starboard control linkage 197 thus provide a mechanical link between the starboard-side control mechanism 196 and the starboard tubular housing 148a.

Similarly, the second bell crank 216 provides a mechanical link between the starboard-side control mechanism 196 and the port tubular housing 148b. The second bell crank 216 extends rearwardly along the starboard arm 192 from the bracket 215. The bell crank 216 is connected at a rearward end to an elongated tube (not shown) that preferably extends parallel to the connecting section 195 to the port control linkage 199 (FIG. 17).

The grip 212 is preferably coupled to the calipers 202 such that the pilot may pivot the grip 212 toward the stick 210 to release the calipers 202 from engagement with the plates 200. This allows the pilot 34 to move the main control member 190 to a desired position. The pilot 34 then releases the grip 212 to return the calipers 202 to engagement with the plates 200 and maintain the current position of the main control member 190. It will be appreciated that the calipers 202 may also be coupled to the grip 208 on the port side control mechanism 198.

Preferably, "gross" movement of the fan assemblies 36 is accomplished by lifting and/or lowering the main control member 190 by applying a force to the starboard and port arms 192, 194. "Gross" movement of the fan assemblies refers to tilting the fan assemblies 36 up to approximately ±20°. When the pilot lifts or lowers the main control member 190, the attached control linkages 197, 199 provide a torque to the rotatable tubular housings 148 to thereby collectively tilt the attached fan assemblies 138. The pilot 34 may thus vary the direction of fan thrust during flight and control the forward and backward translation of the aircraft 30. As mentioned, the gas springs 204 advantageously reduce the likelihood of the pilot moving the main control member 190 too quickly by limiting the rate of movement thereof.

The starboard-side control mechanism 196 preferably provides "fine" control over the orientation of the fan assemblies 36. That is, the starboard-side control mechanism 196 allows the pilot 34 to vary the tilt of the fan assemblies 36 in increments of up to ±5° relative to the current gross setting. Preferably, the pilot 34 tilts the starboard-side control mechanism 196 forwardly or backwardly to collectively tilt the fan assemblies 36. Specifically, when the starboard-side control mechanism 196 is tilted forward or backward, the attached bell cranks 214, 216 are also translated forward or backward via their attachments to the brackets 215 and 217. The translation of the bell cranks 214 is transferred to the attached control linkages 197, 199 via the starboard linkage arm 218 and a similar linkage arm on the port-side of the aircraft 30. The control linkages 197, 199 move upward or downward and apply a torque to the tubular housings 148 so that the tubular housings 148 rotate and collectively tilt the attached fan assemblies 138.

The pilot 34 preferably rotates or twists the starboard-side control mechanism 196 about the stick 210 to provide a differential motion to the bell cranks 214, 216. As the starboard-side control mechanism 196 rotates, the brackets 215, 217 move the first bell crank 214 in a forward direction and the second bell crank 216 in a rearward direction (or vice-versa depending on the rotational direction which the stick 210 is rotated). The bell cranks 214, 216 thus move in opposite directions when the starboard-side control mechanism 198 is twisted. The bell cranks thereby provide a differential motion to the starboard and port control linkages 197, 199 so that the attached starboard and port tubular housings 148a,b rotate in opposite directions. Accordingly, the attached fan assemblies 36 are also differentially tilted when the portside control mechanism 198 is twisted. Differential tilting of the starboard and port fan assemblies 36 creates a moment about the aircraft center of gravity which results in yaw of the aircraft 30. By varying the level of tilt differential of the fan assemblies 36, the pilot may vary the amount of yaw rate provided to the aircraft 30.

As mentioned, the main control member 190 preferably provides a gross range of approximately 20° of rotational motion of tilt to the fan assemblies 36. Preferably, every one degree of rotation of the main control member 190 provides approximately ±2 degrees of tilt to each of the fan assemblies 36. The main control member 190 provides a leveraged moment arm to the fan assemblies 36 so that the fan assemblies may 26 overcome airloads when tilting during flight. The starboard-side control member 196 preferably provides a mechanically advantaged movement to the fan assemblies 36. Preferably, approximately 6–8 degrees of pivot of the control member 190 results in approximately ±1 degree of tilt to the fan assemblies 36 relative to the current gross setting. Approximately 4 degrees of rotation of the control member 190 preferably provides approximately ±1 degree of differential tilt to the fan assemblies 36. The starboard-side control member 196, even with its short moment arm, provides a high mechanical advantage over the tilt of the fan assemblies 36 to overcome airloads thereon during flight.

Starboard and port translational control is preferably achieved by the pilot shifting his or her weight in the starboard or port directions, respectively, to thereby induce a moment to the airframe. As mentioned, the center of gravity 38 of the aircraft 30 is aligned with both the median plane of the aircraft and with the median plane of the pilot's torso. The pilot 34 shifts his or her torso toward the starboard or port side of the aircraft 30 to induce a rolling moment about the aircraft center of gravity 38. The pilot 34 repositions the torso by exerting a force on the back cushion 80 so that the cushion 80 slides along the rails 81 (FIG. 6). An adjustable harness is used to positively secure the pilot 34 to the cushion 80 and the airframe 32 during such weight adjustments.

The "A" shape of the aircraft 30 facilitates the pilot's control of the aircraft with respect to weight shifting. The pilot's body weight is distributed across the width of the airframe 32 as a result of the spread-out orientation of the pilot's legs, which are aligned with the front legs 48. The shifting of the pilot's torso toward the port or starboard sides of the airframe 32 manifests the weight shifting across the width of the airframe 32 via the pilot's legs. Additionally, the pilot's spread legs create a small front-view profile that produces less drag than if the pilot's legs were juxtaposed with one another.

Shifts in the pilot's position may be combined with various fan assembly orientations to maneuver the aircraft 30 during flight. Advantageously, the location of the center of gravity 38 at the midway point of the forward/rearward dimension of the aircraft 30 and at the torso level of the pilot increases the pilot's kinesthetic control over the aircraft 30. Because the center of gravity of the aircraft 30 is positioned near the pilot's torso, shifts in the pilot's torso in the starboard and port direction correspond relatively directly to shifts in the moments about the aircraft center of gravity.

The pilot 34 has convenient access to the various control mechanisms of the control system. The starboard and port arms 192, 194 of the main control member 190 are desirably dimensioned such that the pilot may rest his or her arms thereon during flight. Advantageously, the starboard and port-side control mechanisms 196 198 are positioned where the pilot's hands are located to provide easy access to the "fine" adjustment of the fan assemblies 36 and engine throttle. The ergonomic design of the control system advantageously allows the pilot 34 to control the aircraft without having to change his or her line of sight to search for the control mechanisms.

In operation, the pilot 34 first boards the aircraft by positioning his or her feet on respective foot rests 90 on the front legs 48. The pilot 34 faces forward so that the back of the torso is adjacent the cushion 80. The cushion 80 or the back support panel 74 is equipped with a harness for securing the pilot 34 in place. After boarding, the pilot 34 is in a standing or upright orientation with the airframe 32 supporting the entire weight of the pilot. Advantageously, the pilot 34 has an unobstructed forward field of vision. The "A" shape of the airframe 32 provides a gradual decrease in size of thereof moving in the upward direction, so that the pilot also has a relatively unobstructed rear field of vision. None of the aircraft weight is supported by the pilot.

The pilot 34 then activates the engine 40 in a well known manner to provide power to the fan assemblies 36. Preferably, the fans 102 are facing such that they are initially spinning in a plane parallel to the ground plane so that the resulting thrust force is directly vertical or in a "leveled" position. Preferably, the main control member 190 includes a detent that allows the pilot to position the fans 102 at the leveled position and verify the same. The pilot 34 increases the level of throttle of the engine 40 using the port-side control mechanism 198 until the fan assemblies 36 generate sufficient force to vertically lift the aircraft 30. After the aircraft 30 has reached a desired altitude, the pilot 34 may transfer to forward flight by collectively tilting the fan assemblies 36 using the main control member 190 and/or the starboard-side control mechanism 196. The aircraft 34 maintains the pilot 34 in a general upright orientation continuously during flight. The entire aircraft 30, including the pilot 34, may tilt into the direction of flight during cruise.

The aircraft 30 is a convenient and reliable means of transportation. The gasoline-powered engine 40 is easily fueled and maintained to reduce maintenance costs of the aircraft 30 and increase reliability. The control mechanisms provide the pilot 34 with intuitive control over the aircraft 30 during flight. Advantageously, the pilot 34 may also shift his or her torso during flight to perform fully coordinated turns during cruise of the aircraft. The position of the center of gravity 38 near the midpoint of the both the front-to-rear and outboard dimensions of the aircraft increases the stability of the aircraft 30 during flight.

Although the foregoing description of the preferred embodiment of the invention has shown, described, and pointed out certain novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, which is intended to illustrate rather than limit the scope of the invention.

What is claimed is:

1. A single passenger, vertical take-off and landing aircraft, comprising:
    an airframe configured to support a pilot in a standing position toward a front portion of the airframe, the airframe having essentially an A-shaped configuration and being symmetric about a medial plane and comprising three legs arranged in a tripod configuration for supporting the airframe upright, with a pilot alignment line defined as extending from about the feet of the standing pilot and passing through his head, the pilot alignment line lying in the medial plane;
    a pair of fans mounted on an upper end of the airframe above the pilot, the fans each being tiltable about a common axis, wherein the fans are positioned symmetrically with respect to the medial plane and wherein each of the fans are rotatably mounted within a fan duct comprised of a first material, the fan duct including an annular strip of material surrounding the corresponding fan, wherein the annular strip of material comprises a material softer than the first material;
    an engine mounted on the airframe to the rear of the pilot, the engine drivingly coupled to each of the pair of fans and the engine being mounted at a height about even with the torso of the standing pilot so that the center of gravity of the aircraft lies in the medial plane at about the height of the torso of the standing pilot;
    a movable control on the airframe, the control coupled to the pair of fans so that the fans tilt about the axis in response to movement of the control; and
    a powertrain system drivingly coupling the engine to each of the fans, the powertrain system comprising a first drive axle extending upwardly behind the pilot within the medial plane and a second drive axle extending above the pilot transverse to the medial plane, the engine and the first drive axle being longitudinally aligned and defining an engine alignment line in the medial plane from the engine along the first drive axle, the engine alignment line being angled slightly toward the front portion of the airframe and forming an acute angle with said pilot alignment line.

2. The aircraft as in claim 1 wherein the fans rotate in opposite directions.

3. The aircraft as in claim 1 wherein each of the fans comprises fixed pitch rotor blades.

4. A single passenger, vertical take-off and landing aircraft, comprising:
    an airframe configured to support a pilot in a standing position toward a front portion of the airframe, the airframe having essentially an A-shaped configuration and being symmetric about a medial plane and comprising three legs arranged in a tripod configuration for supporting the airframe upright, with a pilot alignment line defined as extending from about the feet of the standing pilot and passing through his head, the pilot alignment line lying in the medial plane;
    a pair of fans mounted on an upper end of the airframe above the pilot, the fans each being tiltable about a common axis, wherein the fans are positioned symmetrically with respect to the medial plane;
    an engine mounted on the airframe to the rear of the pilot, the engine drivingly coupled to each of the pair of fans and the engine being mounted at a height about even with the torso of the standing pilot so tat the center of gravity of the aircraft lies in the medial plane at about the height of the torso of the standing pilot;
    a movable control on the airframe, the control coupled to the pair of fans so that the fans tilt about the axis in response to movement of the control;
    a powertrain system drivingly coupling the engine to each of the fans, the powertrain system comprising a first drive axle extending upwardly behind the pilot within the medial plane and a second drive axle extending above the pilot transverse to the medial plane, the engine and the first drive axle being longitudinally aligned and defining an engine alignment line in the medial plane from the engine along the first drive axle, the engine alignment line being angled slightly toward the front portion of the airframe and forming an acute angle with said pilot alignment line; and
    a back support member disposed on the airframe, the back support member positioned to support the torso of the pilot, wherein the back support member is movably mounted so as to be translatable along a direction transverse to the medial plane.

5. A single passenger, vertical take-off and landing aircraft, comprising:
    an airframe configured to support a pilot in a standing position toward a front portion of the airframe, the airframe being symmetric about a medial plane;
    a pair of propulsion devices mounted on an upper end of the airframe above the pilot, the propulsion devices each being tiltable about a common axis;

an engine mounted on the airframe to the rear of the pilot, the engine being mounted at a height about even with the torso of the standing pilot so that the center of gravity of the aircraft lies in the medial plane at about the height of the torso of the standing pilot, the engine drivingly coupled to each of the propulsion devices;

a movable control on the airframe adjacent the pilot, the control being coupled to the propulsion devices so that the propulsion devices tilt about the axis in response to movement of the control;

a powertrain system drivingly coupling the engine to each of the propulsion devices the powertrain system comprising a first drive axle extending upwardly behind the pilot within the medial plane and a second drive axle extending above the pilot transverse to the medial plane;

a central gear box mechanically coupling the first drive axle to the second drive axle;

a pair of outboard gear boxes each including a gear system mechanically coupling the second drive axle to one of the fans, wherein each gear box comprises an outer housing including an end plate rotatably mounted to the gear box, a first gear, and a second gear in meshed engagement with the first gear, wherein the first gear is fixedly coupled to the end plate so that rotational movement of the end plate translates the first gear with respect to the second gear;

a fuel tank coupled to the engine, the fuel tank comprising a transparent container having markings positioned to indicate the volumetric level of fuel in the fuel tank and the volumetric level of fuel required to fill the fuel tank; and an oil tank fluidly coupled to the fuel tank, the oil tank comprising a transparent container having markings positioned to indicate the volumetric level of oil in the oil tank.

6. A single passenger, vertical take-off and landing aircraft, comprising:

an airframe configured to support a pilot in a standing position toward a front portion of the airframe, the airframe being symmetric about a medial plane;

a pair of propulsion devices mounted on an upper end of the airframe above the pilot, the propulsion devices each being tiltable about a common axis;

an engine mounted on the airframe to the rear of the pilot, the engine being mounted at a height about even with the torso of the standing pilot so that the center of gravity of the aircraft lies in the medial plane at about the height of the torso of the standing pilot, the engine drivingly coupled to each of the propulsion devices;

a movable control on the airframe adjacent the pilot, the control being coupled to the propulsion devices so that the propulsion devices tilt about the axis in response to movement of the control;

a powertrain system drivingly coupling the engine to each of the propulsion devices the powertrain system comprising a first drive axle extending upwardly behind the pilot within the medial plane and a second drive axle extending above the pilot transverse to the medial plane;

a central gear box mechanically coupling the first drive axle to the second drive axle;

a pair of outboard gear boxes each including a gear system mechanically coupling the second drive axle to one of the fans, wherein each gear box comprises an outer housing including an end plate rotatably mounted to the gear box, a first gear, and a second gear in meshed engagement with the first gear, wherein the first gear is fixedly coupled to the end plate so that rotational movement of the end plate translates the first gear with respect to the second gear and wherein the end plate is threaded into the outer housing;

a fuel tank coupled to the engine, the fuel tank comprising a transparent container having markings positioned to indicate the volumetric level of fuel in the fuel tank and the volumetric level of fuel required to fill the fuel tank; and an oil tank fluidly coupled to the fuel tank, the oil tank comprising a transparent container having markings positioned to indicate the volumetric level of oil in the oil tank.

7. A single passenger, vertical take-off and landing aircraft, comprising:

an airframe configured to support a pilot in a standing position toward a front portion of the airframe, the airframe being symmetric about a medial plane and comprising three legs arranged in a tripod configuration for supporting the airframe upright, with a pilot alignment line defined as extending from about the feet of the standing pilot and passing through his head, the pilot alignment line lying in the medial plane;

a pair of fans mounted on an upper end of the airframe above the pilot, the fans each being tiltable about a common axis, wherein the fans are positioned symmetrically with respect to the medial plane and each of the fans are rotatably mounted within a fan duct comprised of a first material, the fan duct including an annular strip of material surrounding the corresponding fan, wherein the annular strip of material comprises a material softer than the first material;

an engine mounted on the airframe to the rear of the pilot, the engine drivingly coupled to each of the pair of fans and the engine being mounted at a height about even with the torso of the standing pilot so that the center of gravity of the aircraft lies in the medial plane at about the height of the torso of the standing pilot;

a movable control on the airframe, the control coupled to the pair of fans so that the fans tilt about the axis in response to movement of the control; and a powertrain system drivingly coupling the engine to each of the fans, the powertrain system comprising a first drive axle extending upwardly behind the pilot within the medial plane and a second drive axle extending above the pilot transverse to the medial plane, the engine and the first drive axle being longitudinally aligned and defining an engine alignment line in the medial plane from the engine along the first drive axle, the engine alignment line being angled slightly toward the front portion of the airframe and forming an acute angle with said pilot alignment line.

8. The aircraft of claim 7, additionally comprising a back support member on the airframe, the back support member positioned to support the torso of the pilot, wherein the back support member is movably mounted so as to be translatable along a direction transverse to the medial plane.

9. The aircraft of claim 7 further comprising a pilot adjustment system for adjusting the position of the pilot to maintain the center of gravity of the aircraft at about the torso of the pilot regardless of the height of the pilot.

10. The aircraft of claim 7 wherein each of the pair of fans comprises fixed pitch rotor blades.

11. The aircraft of claim 7 wherein the pair of fans may be tilted about the axis in the same direction in response to movement of the control.

12. The aircraft of claim 7 wherein the pair of fans may be tilted about the axis in opposite directions in response to movement of the control.

13. A vertical take-off and landing aircraft, comprising:
an airframe configured to support a pilot in a standing position toward the front of the airframe, the airframe being symmetric about a medial plane and comprising at least three legs for supporting the airframe in an upright position;
a pair of fans mounted on an upper end of the airframe above the pilot, the fans each being tiltable about a common axis and being positioned symmetrically about the medial plane;
an engine mounted on the airframe to the rear of the pilot and generally at about the height of the torso of the pilot, the engine being drivingly coupled to each of the pair of fans;
a powertrain system mounted on the airframe for drivingly coupling tie engine to each of the fans and positioned above the engine and generally at about the height of the shoulders and head of the pilot whereby the resulting center of gravity of the aircraft is at about the height of the torso of the pilot and below the center of drag of the aircraft to achieve maneuverability and stability during flight; and
a pilot support system for adjusting the position of the pilot to maintain the center of gravity of the aircraft at about the height of the torso of the pilot regardless of the height of the pilot.

14. The aircraft of claim 13 wherein the pilot support system comprises a movable footrest upon the airframe of the aircraft, the footrest being capable of being positioned at a variety of vertical heights along the airframe.

15. The aircraft of claim 14 wherein the pilot support system further comprises a second movable footrest upon the airframe of the aircraft.

16. The aircraft of claim 14 wherein each of the pair of fans comprises fixed pitch rotor blades.

17. The aircraft of claim 14 wherein the pair of fans rotate in opposite directions.

18. A single passenger, vertical take-off and landing aircraft, comprising:
an airframe configured to support a pilot in a standing position toward a front portion of the airframe, the airframe being symmetric about a medial plane;
a pair of propulsion devices mounted on an upper end of the airframe above the pilot, the propulsion devices each being tiltable about a common axis;
an engine mounted on the airframe to the rear of the pilot, the engine being mounted at a height about even with the torso of the standing pilot so that the center of gravity of the aircraft lies in the medial plane at about the height of the torso of the standing pilot, the engine drivingly coupled to each of the propulsion;
a moveable control on the airframe adjacent the pilot, the control being coupled to the propulsion devices so that the propulsion devices tilt about the axis in response to movement of the control;
a powertrain system drivingly coupling the engine to each of the propulsion devices, the powertrain system comprising a first drive axle extending upwardly behind the pilot within the medial plane and a second drive axle extending above the pilot transverse to the medial plane;
a fuel tank coupled to the engine, the fuel tank comprising a transparent container having markings positioned to indicate the volumetric level of fuel in the fuel tank and the volumetric level of fuel required to fill the fuel tank;
an oil tank fluidly coupled to the fuel tank, the oil tank comprising a transparent container having markings positioned to indicate the volumetric level of oil in the oil tank;
a central gear box mechanically coupling the first drive axle to the second drive axle; and
a pair of outboard gear boxes each including a gear system mechanically coupling the second drive axle to one of the fans, wherein each gear box comprises an outer housing including an end plate rotatably mounted to the gear box, a first gear, and a second gear in meshed engagement with the first gear, wherein the first gear is fixedly coupled to the end plate so that rotational movement of the end plate translates the first gear with respect to the second gear.

19. A VTOL aircraft, comprising:
an airframe configured to support one passenger in a standing position, the airframe being symmetric about a medial plane and supported on the ground in an upright position;
a pair of fans mounted on an upper end of the airframe above the passenger and positioned symmetrically about the medial plane;
a power system mounted on the airframe and generally at about the height of the torso of the standing passenger, the power system coupled to each of the pair of fans:
the airframe being configured such that its mass is primarily distributed generally at about the height of the standing passenger such that, considering the power system and the pair of fans, the center of gravity of the aircraft is at about the height of the torso of the standing passenger; and
a passenger adjustment system for maintaining the center of gravity at approximately the same location independent of the height of the passengers.

* * * * *

UNITED STATES PATENT AND TRADEMARK OFFICE
CERTIFICATE OF CORRECTION

PATENT NO.      : 6,488,232 B2                                          Page 1 of 1
DATED           : December 3, 2002
INVENTOR(S)     : Michael Moshier It is certified that error appears in the above-identified patent and that said Letters Patent is hereby corrected as shown below:

Column 22,
Line 37, please change "with the torso of the standing pilot so tat the center of" to
-- with the torso of the standing pilot so that the center of --.

Column 25,
Line 23, please change "ingly coupling tie engine to each of the fans and" to -- ingly coupling the engine to each of the fans and --.
Line 30, please change "a pilot support system for adjusting the position of the" to
-- a pilot support system for adjusting a vertical position of the --

Column 26,
Line 3, please add the word "devices" at the end of the line so that it reads -- drivingly coupled to each of the propulsion devices --
Line 44, please add the word "being" between the words "system" and "coupled" so that the line reads -- the power system being coupled to each of the pair of fans; --
Line 54, after "dent of the height of the passengers", please add -- wherein the passenger adjustment system comprises a movable footrest upon the airframe of the aircraft, the footrest being capable of being positioned at a variety of vertical heights along the airframe. --

Signed and Sealed this

Eighteenth Day of March, 2003

JAMES E. ROGAN
*Director of the United States Patent and Trademark Office*